US010645920B2

(12) United States Patent
Litwin et al.

(10) Patent No.: US 10,645,920 B2
(45) Date of Patent: May 12, 2020

(54) PORTABLE HUNTING BLIND BASE AND ACCESSORIES THEREFOR

(71) Applicant: Under Blind, Inc., Pittsburgh, PA (US)

(72) Inventors: Christopher J. Litwin, Pittsburgh, PA (US); Karl William Weiss, Canonsburg, PA (US); Chika Fujii-Litwin, Pittsburgh, PA (US); Jeffrey Arthur Evans, Gibsonia, PA (US)

(73) Assignee: UNDER BLIND, INC., Pittsburgh, PA (US)

( * ) Notice: Subject to any disclaimer, the term of this patent is extended or adjusted under 35 U.S.C. 154(b) by 0 days.

(21) Appl. No.: 15/650,206

(22) Filed: Jul. 14, 2017

(65) Prior Publication Data
US 2018/0014529 A1 Jan. 18, 2018

Related U.S. Application Data

(60) Provisional application No. 62/362,361, filed on Jul. 14, 2016.

(51) Int. Cl.
*A01M 31/02* (2006.01)
*E04H 15/56* (2006.01)
(Continued)

(52) U.S. Cl.
CPC ........ *A01M 31/025* (2013.01); *A01M 31/002* (2013.01); *A47B 3/08* (2013.01); *A47B 3/083* (2013.01); *A47B 3/0911* (2013.01); *E04H 15/001* (2013.01); *E04H 15/56* (2013.01); *F41A 23/02* (2013.01); *F41A 23/18* (2013.01);
(Continued)

(58) Field of Classification Search
CPC . A01M 31/022; A01M 31/025; E04H 15/001; E04H 15/56; Y10S 135/901; F41B 5/1453; A47B 3/08; A47B 3/083; A47B 3/0911; A47B 2003/0821; A47B 9/14; D06F 81/04
USPC .................... 135/116, 901; 43/1; 52/79.5, 7; 89/37.04; 108/25, 26, 116, 117, 147.21, 108/127, 128; 312/242; 5/620
See application file for complete search history.

(56) References Cited

U.S. PATENT DOCUMENTS 485,855 A * 11/1892 Bassett ......................... 108/127
622,284 A * 4/1899 Snyder ................... A47B 67/02
312/242

(Continued)

FOREIGN PATENT DOCUMENTS

CA 2389102 A1 * 12/2003 ........... E04B 1/3442
CA 2973252 A1 * 1/2018 .......... A01M 31/002
(Continued)

*Primary Examiner* — Robert Canfield
(74) *Attorney, Agent, or Firm* — The Webb Law Firm

(57) ABSTRACT

A base for supporting a hunting blind includes a plurality of outer frame members connected to one another to form an outer frame, at least one floor panel positioned on a top surface of the outer frame, and at least one of the floor panels defining at least one aperture to receive a storage bin. A plurality of support members may be configured to support the outer frame, the support members being configured for insertion into a ground surface. A height of each support member relative to the ground surface may be adjustable to provide a level position for the outer frame.

25 Claims, 21 Drawing Sheets

(51) Int. Cl.
*A47B 3/08* (2006.01)
*E04H 15/00* (2006.01)
*F41A 23/18* (2006.01)
*F41B 5/14* (2006.01)
*A47B 3/083* (2006.01)
*A47B 3/091* (2006.01)
*A01M 31/00* (2006.01)
*F41A 23/02* (2006.01)
*F41H 3/02* (2006.01)

(52) U.S. Cl.
CPC .... *F41B 5/1453* (2013.01); *A47B 2003/0821* (2013.01); *F41H 3/02* (2013.01); *Y10S 135/901* (2013.01)

(56) References Cited

U.S. PATENT DOCUMENTS

| | | | | |
|---|---|---|---|---|
| 891,266 | A | 6/1908 | Koen | |
| 928,726 | A * | 7/1909 | Witthaus | A47B 96/02 108/12 |
| 1,039,868 | A * | 10/1912 | Whitney | A47B 3/08 108/115 |
| 1,205,569 | A * | 11/1916 | Schwimmer | A47J 36/24 126/33 |
| 1,429,969 | A * | 9/1922 | Palmer | A47B 3/08 108/115 |
| 1,721,198 | A * | 7/1929 | Athey | E04B 1/3441 135/116 |
| 2,024,431 | A * | 12/1935 | Corduan | A47B 3/0916 108/127 |
| 2,473,076 | A * | 6/1949 | Scheibner | A01K 97/01 135/116 |
| 2,717,160 | A * | 9/1955 | Schmidt | E04H 15/001 135/116 |
| 2,804,083 | A * | 8/1957 | Wieber | E04B 1/3441 135/116 |
| 2,883,713 | A * | 4/1959 | Zug | E04B 1/3445 52/264 |
| 2,905,513 | A * | 9/1959 | Kane | A47B 3/00 108/128 |
| 3,095,231 | A * | 6/1963 | Reed | B60P 3/341 135/116 |
| 3,223,055 | A | 12/1965 | Braun | |
| 3,289,787 | A * | 12/1966 | McSwain | E04H 15/001 182/20 |
| 3,330,081 | A * | 7/1967 | Behnk | E04B 1/34321 52/127.11 |
| 3,605,140 | A * | 9/1971 | Warner | A47C 17/82 135/116 |
| 3,739,536 | A | 6/1973 | Ward | |
| 3,826,270 | A * | 7/1974 | Hentges | E04H 15/001 135/116 |
| 3,844,300 | A * | 10/1974 | Sanders | B60P 3/38 135/116 |
| 3,878,797 | A * | 4/1975 | Patterson | A47B 3/083 108/90 |
| 3,985,387 | A | 10/1976 | Rischar | |
| 4,101,163 | A | 7/1978 | Morin | |
| D260,674 | S * | 9/1981 | Simmons | D22/107 |
| 4,317,519 | A | 3/1982 | Talley | |
| 4,471,793 | A * | 9/1984 | Cattaneo | B60P 3/38 135/88.16 |
| 4,625,655 | A * | 12/1986 | Brickman | A47B 3/02 108/25 |
| 4,658,759 | A * | 4/1987 | Brown | A01K 5/0114 119/61.5 |
| 4,830,036 | A * | 5/1989 | Sanders | E04H 15/06 135/132 |
| 4,926,893 | A | 5/1990 | Klopfenstein et al. | |
| 5,069,142 | A * | 12/1991 | Matre | A47B 3/02 108/115 |
| 5,327,838 | A * | 7/1994 | Beltman | A47B 25/00 108/25 |
| 5,341,588 | A | 8/1994 | Lizotte | |
| 5,345,881 | A * | 9/1994 | Loescher | A47B 3/0818 108/131 |
| 5,368,126 | A * | 11/1994 | Woodward | E04G 1/20 182/118 |
| 5,371,966 | A * | 12/1994 | Hall | A01M 31/00 135/117 |
| 5,375,905 | A * | 12/1994 | Flitter | A01K 97/22 297/15 |
| 5,377,657 | A * | 1/1995 | Foster | F41B 5/14 124/23.1 |
| 5,414,949 | A * | 5/1995 | Peebles | F41A 23/16 42/94 |
| 5,622,198 | A | 4/1997 | Elsinger | |
| D382,035 | S * | 8/1997 | Swicegood | D22/108 |
| 5,778,800 | A * | 7/1998 | Liang | A47B 88/493 108/26 |
| 5,979,725 | A * | 11/1999 | Lehrman | B60R 7/02 220/23.87 |
| 6,192,909 | B1 * | 2/2001 | Strausser | E04H 15/40 135/116 |
| 6,289,824 | B1 | 9/2001 | Parker et al. | |
| 6,305,117 | B1 * | 10/2001 | Hales, Sr. | F41A 23/02 42/94 |
| D450,959 | S * | 11/2001 | Birsel | D6/707.19 |
| 6,892,651 | B1 | 5/2005 | Van Reed et al. | |
| 7,314,199 | B1 | 1/2008 | Ward | |
| 7,726,080 | B2 * | 6/2010 | Hyndman | B60R 5/04 174/480 |
| D619,671 | S | 7/2010 | Jenkins | |
| 8,220,197 | B1 * | 7/2012 | Pray | A01M 1/106 135/159 |
| 8,671,963 | B2 * | 3/2014 | Shih | E04H 15/60 135/137 |
| 8,761,963 | B2 * | 6/2014 | Hinkel, III | B62D 1/00 188/24.19 |
| 8,857,346 | B2 * | 10/2014 | Khanjian | A47B 3/087 108/26 |
| 8,857,926 | B2 * | 10/2014 | Toro | A47B 37/00 312/242 |
| 10,117,513 | B1 * | 11/2018 | Tolentino | A47B 31/04 |
| 2005/0265711 | A1 * | 12/2005 | Heibel | B60R 11/04 396/419 |
| 2006/0254480 | A1 | 11/2006 | Haimoff | |
| 2007/0056482 | A1 * | 3/2007 | Robinson | A47B 3/06 108/25 |
| 2008/0047188 | A1 * | 2/2008 | Lindstrom | F41A 23/02 42/94 |
| 2008/0061576 | A1 * | 3/2008 | Hwang | B60R 5/04 296/37.5 |
| 2009/0114689 | A1 * | 5/2009 | Hord | B63B 19/12 224/484 |
| 2010/0018130 | A1 * | 1/2010 | Lopez | E04B 1/3445 52/71 |
| 2010/0123067 | A1 * | 5/2010 | Cardenas | F41B 5/06 248/530 |
| 2010/0127032 | A1 * | 5/2010 | Schubring | B60R 7/04 224/542 |
| 2010/0162961 | A1 * | 7/2010 | Hove | A01K 5/0142 119/51.5 |
| 2012/0211042 | A1 * | 8/2012 | Richter | E04H 1/1205 135/143 |
| 2012/0211306 | A1 * | 8/2012 | Benefield | E06C 7/16 182/115 |
| 2013/0145671 | A1 * | 6/2013 | Cavell | F41B 5/1453 42/94 |
| 2014/0245933 | A1 | 9/2014 | Leslie et al. | |
| 2015/0027067 | A1 * | 1/2015 | Finney | E04B 1/34363 52/79.5 |

(56) References Cited

U.S. PATENT DOCUMENTS

2018/0155921 A1\* 6/2018 Evert ........................ E04H 9/06
2019/0274298 A1\* 9/2019 Peel ...................... E04H 15/001

FOREIGN PATENT DOCUMENTS

FR       1009968 A  \*  6/1952  ............... A47B 3/08
GB        640937 A  \*  8/1950  ............. A47B 3/083

\* cited by examiner

PORTABLE HUNTING BLIND BASE AND ACCESSORIES THEREFOR

CROSS REFERENCE TO RELATED APPLICATION

This application claims the benefit of U.S. Provisional Patent Application No. 62/362,361, filed on Jul. 14, 2016, the disclosure of which is incorporated herein by reference in its entirety.

BACKGROUND OF THE INVENTION

Field of the Invention

This disclosure relates generally to hunting blind bases and, in particular, to a hunting blind base with accessories for storing, transporting, and assembling the hunting blind and items used by a hunter when using the hunting blind.

Description of Related Art

Hunting blinds are typically used by hunters to conceal or camouflage the hunter's position and/or scent when hunting for animals. The hunting blinds increase the hunter's success of avoiding detection by the animals and shooting the animals from the hunting blind. Conventional hunting blinds, however, are typically placed on a ground surface in a forest or field. The hunters typically place their equipment on the ground surface in the hunting blind, which can create a plurality of obstructions in the hunting blind and can reduce the space available for a hunter to move within the hunting blind. Due to the hunter's equipment being placed on the ground surface in the hunting blind, the hunter is more susceptible to tripping on his/her equipment or creating noise that can distract and alert animals to the hunter's presence. Further, conventional hunting blinds are configured to rest on a flat surface at a hunting location. The hunting blinds are typically unable to be assembled on a hillside or angled surface.

In view of the foregoing, a need exists for a hunting blind base that is easily transported to a hunting location. A further need exists for a hunting blind base that is easily assembled and disassembled in the field. A further need exists for a hunting blind base that can be positioned on a hillside or angled surface. A further need exists for a hunting blind base that can be positioned off the ground surface above a swampy area. A further need exists for a hunting blind base that provides increased storage space for hunters to store hunting equipment, food, sleeping equipment, and clothing to reduce the amount of noise made by the hunter in the hunting blind and to keep gear and clothing dry and debris-free.

SUMMARY OF THE INVENTION

Accordingly, and generally, a hunting blind base is provided to address and/or overcome some or all of the deficiencies or drawbacks associated with existing hunting blinds.

In one aspect of the disclosure, a base for supporting a sporting enclosure may include a plurality of outer frame members connected to one another to form an outer frame, at least one floor panel positioned on a top surface of the outer frame, and at least one of the floor panels defining at least one aperture to receive a storage bin.

A plurality of support members may be configured to support the outer frame. A height of each support member relative to the ground surface may be adjustable to provide a level position for the outer frame. The base may include two separate sections rotatably connected to one another. Each section may include a portion of the outer frame and at least one floor panel. A removable seat may be positioned on one of the floor panels. A first floor panel may define an aperture that receives a single storage bin. A second floor panel may define at least two apertures that each receive a storage bin. A table may be stored in one of the floor panels. The table may be configured to move from a stored position within the floor panel to an upright extended position. A bow holder may be provided in one of the floor panels. At least one camera mount may be provided on one of the floor panels. The at least one camera mount may include a first camera mount provided on a first floor panel, and a second camera mount provided on a second floor panel. The second camera mount may have a height greater than a height of the first camera mount. A shooting rail may be provided on one of the floor panels. The shooting rail may be configured to move from a stored position within the floor panel to a shooting position in which the shooting rail is positioned perpendicular to the floor panel. Each floor panel may include an upper padded layer and a rigid base layer.

In another aspect of the disclosure, a sporting enclosure and base may include a sporting enclosure and a base configured to support the sporting enclosure. The base may include an outer frame and at least two floor panels rotatably connected to one another and supported by the outer frame.

At least one of the floor panels may define at least one aperture to receive a storage bin. A plurality of support members may be configured to support the outer frame. A height of each support member relative to the ground surface may be adjustable to provide a level position for the outer frame. The base may include two separate sections rotatably connected to one another. Each section may include a portion of the outer frame and at least one floor panel. A removable seat may be positioned on one of the floor panels. A first floor panel may define an aperture that receives a single storage bin. A second floor panel may include a frame that defines at least two apertures that each receive a storage bin. A table may be stored in one of the floor panels. The table may be configured to move from a stored position within the floor panel to an upright extended position. A bow holder may be provided in one of the floor panels. At least one camera mount may be provided on one of the floor panels. The at least one camera mount may include a first camera mount provided on a first floor panel, and a second camera mount provided on a second floor panel. The second camera mount may have a height greater than a height of the first camera mount. A shooting rail may be provided on one of the floor panels. The shooting rail may be configured to move from a stored position within the floor panel to a shooting position in which the shooting rail is positioned perpendicular to the floor panel. Each floor panel may include an upper padded layer and a rigid base layer. The sporting enclosure may include a hunting blind.

These and other features and characteristics of the hunting blind base, as well as the methods of manufacture and assembly, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a", "an", and "the" include plural referents unless the context clearly dictates otherwise.

DESCRIPTION OF THE DISCLOSURE

For purposes of the description hereinafter, the terms "upper", "lower", "right", "left", "vertical", "horizontal", "top", "bottom", "lateral", "longitudinal", and derivatives thereof shall relate to the invention as it is oriented in the figures. However, it is to be understood that the disclosure may assume alternative variations and step sequences, except where expressly specified to the contrary. It is also to be understood that the specific devices and processes illustrated in the attached drawings, and described in the following specification, are simply exemplary aspects of the disclosure. Hence, specific dimensions and other physical characteristics related to the aspects disclosed herein are not to be considered as limiting.

The present disclosure is directed to, in general, a hunting blind base and, in particular, to a portable hunting blind base including a frame having a plurality of storage compartments and other accessories to be utilized by a hunter when positioned within the hunting blind. Certain preferred and non-limiting aspects of the components of the hunting blind base are illustrated in FIGS. 1-19. While the following description references a hunting blind and hunter that uses the disclosed invention, it is to be understood that the present invention can also be used with other portable enclosures, including but not limited to, military applications in which a solider using a portable enclosure for sleeping or camping in an outdoor setting.

Figure 1:
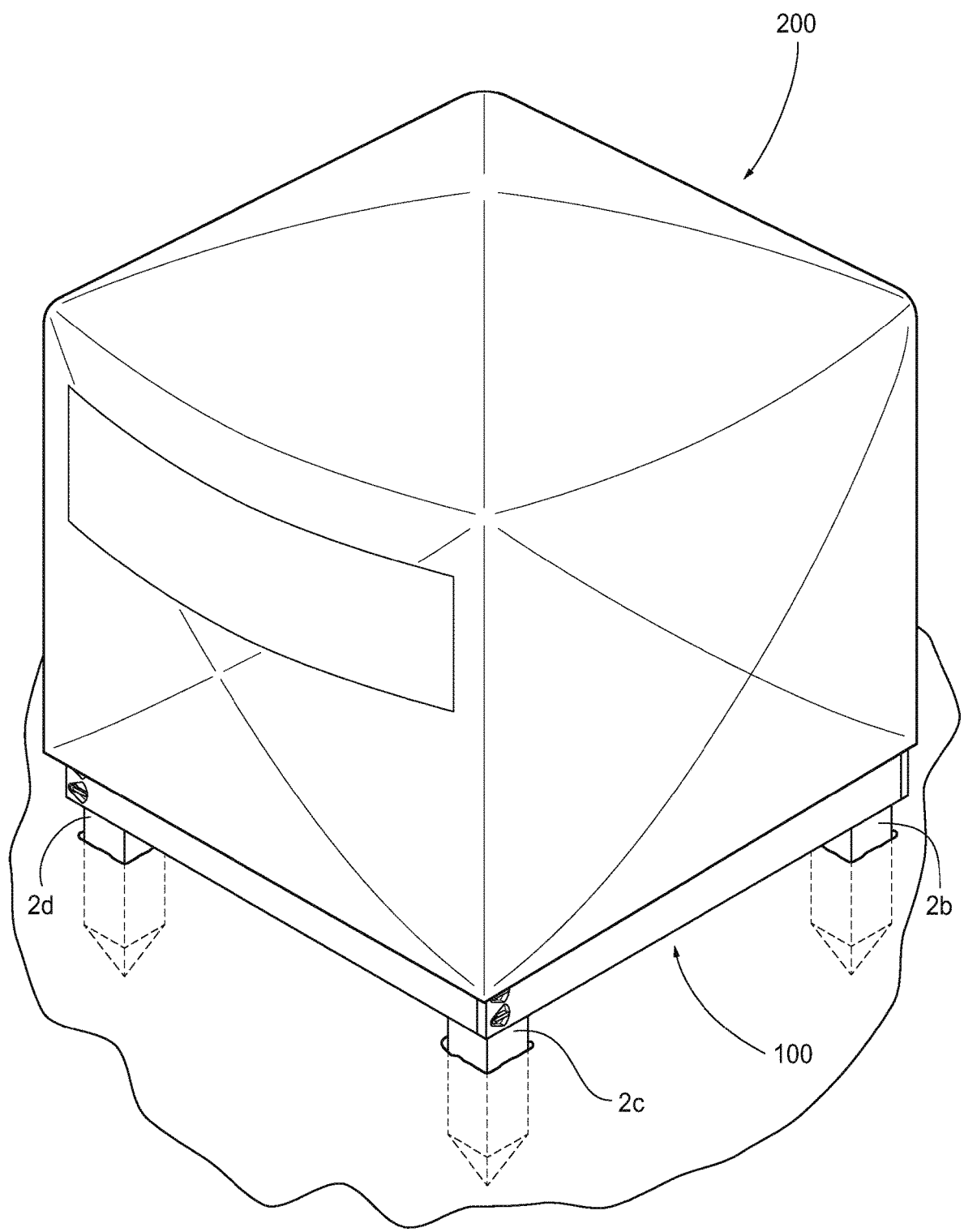
FIG. 1 is a perspective view of a base for supporting a sporting enclosure, such as a hunting blind, provided thereon.

With reference to FIG. 1, a sporting enclosure, which may be a hunting blind 200, is shown positioned on a base 100. It is to be understood that the sporting enclosure may be a hunting blind 200, an ice fishing enclosure, a tent, or any other enclosure using in sporting activities. The base 100 may rest on a plurality of support members 2a-2d. The hunting blind 200 may be any conventional hunting blind that is used by hunters. The hunting blind 200 may provide cover to hunters to reduce the chances of detection from animals, such as deer or water fowl. The hunting blind 200 may provide an inner space in which a hunter can sit or lie down while hunting. The hunting blind 200 may include a window for the hunter to look out of and to shoot from once an animal has been detected. The hunting blind 200 may be portable or a stationary structure that remains in place once assembled by the hunter. The hunting blind 200 may include a strap (not shown) on each bottom corner to connect to the base 100.

Figure 2:
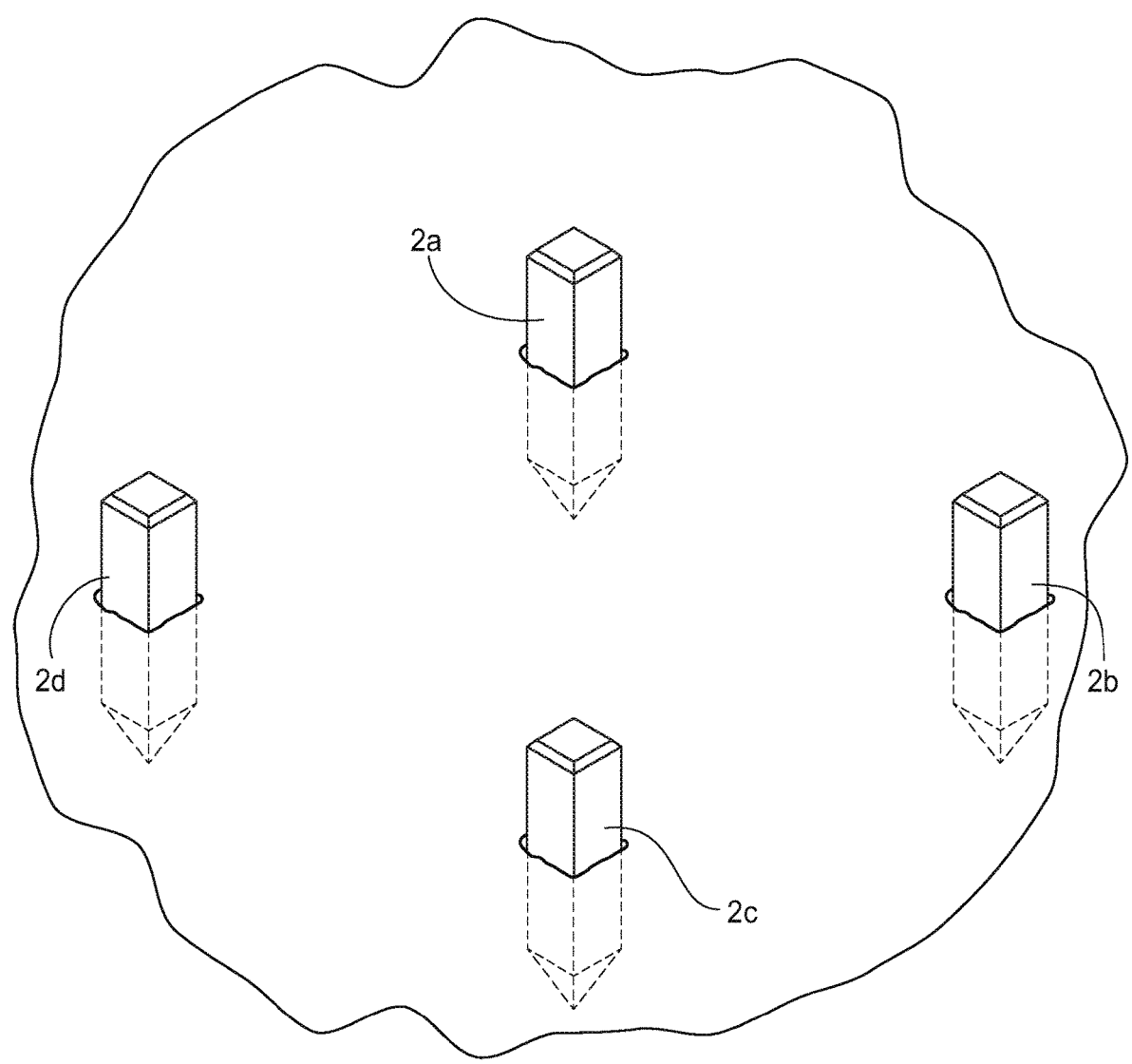
FIG. 2 is a perspective view of a plurality of support members used to hold a base for a hunting blind.

With reference to FIG. 2, the plurality of support members 2a-2d may be configured to hold the base 100 upon which the hunting blind 200 may be assembled. The base 100 is described in greater detail below. In one aspect, four support members 2a-2d may be used to hold the base 100. It is also contemplated that additional support members (not shown) may be used to add greater structural support to the base 100 and the hunting blind 200. The support members 2a-2d may be generally rectangular in shape. The support members 2a-2d may have a pointed end to allow for easier insertion into the ground surface. In one aspect, the support members 2a-2d may be made of wood. It is also contemplated that the support members 2a-2d may be made of metal, plastic, or any other material sufficiently strong enough to hold the base 100. The support members 2a-2d may be water-proof so as not to deteriorate or rust from any moisture in the outdoor environment in which the base 100 and the hunting blind 200 have been assembled. The support members 2a-2d may be hammered into a ground surface at a location the hunter decides to place the hunting blind 200.

Figure 12:
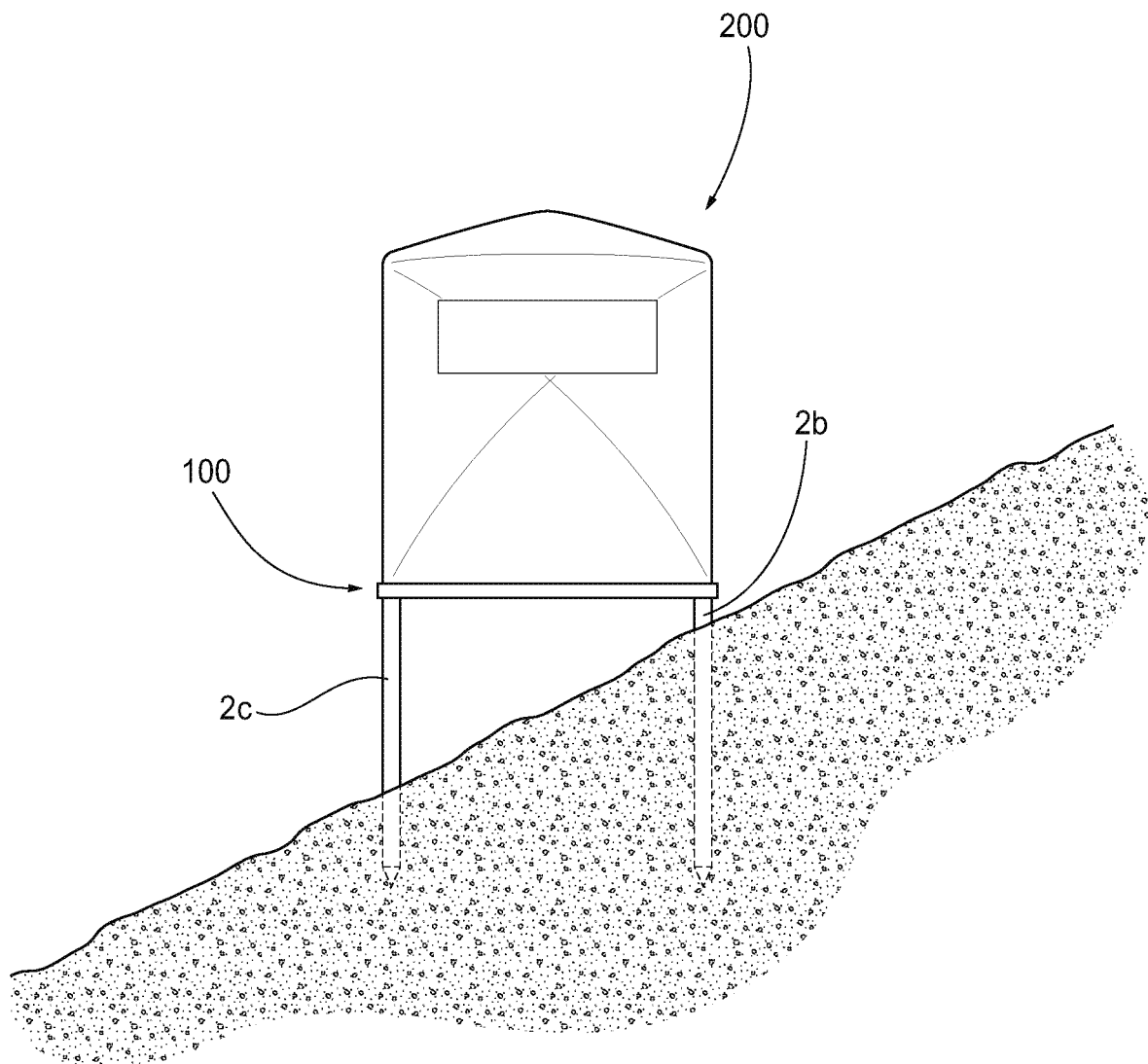
FIG. 12 is a side view of a hunting blind and base positioned on an angled hillside.

With reference to FIG. 12, due to uneven terrain in the field, the support members 2a-2d may need to be inserted at different heights within the ground surface. For example, if a hunter wishes to position the hunting blind 200 and the base 100 on an inclined surface, such as a hill, two of the support members 2a-2d may extend further from the ground surface on the lower side of the hill and the two remaining support members 2a-2d may extend from the higher side of the hill to ensure that the base 100 rests on the support members 2a-2d in a level position. It is also contemplated that each support member 2a-2d may extend at different lengths from an uneven ground surface to provide a level platform to hold the base 100. Based on the selected terrain, the hunter can adjust the height of each support member 2a-2d to ensure that the top surface of each support member 2a-2d is positioned at the same height to provide a level platform for the base 100. The support members 2a-2d may also allow a hunter to position the base 100 and the hunting blind 200 above a ground surface. For example, the hunter may insert the support members 2a-2d in the muddy ground in a swamp. The base 100 and the hunting blind 200 may rest on the support members 2a-2d above the swamp waters.

Figure 3:
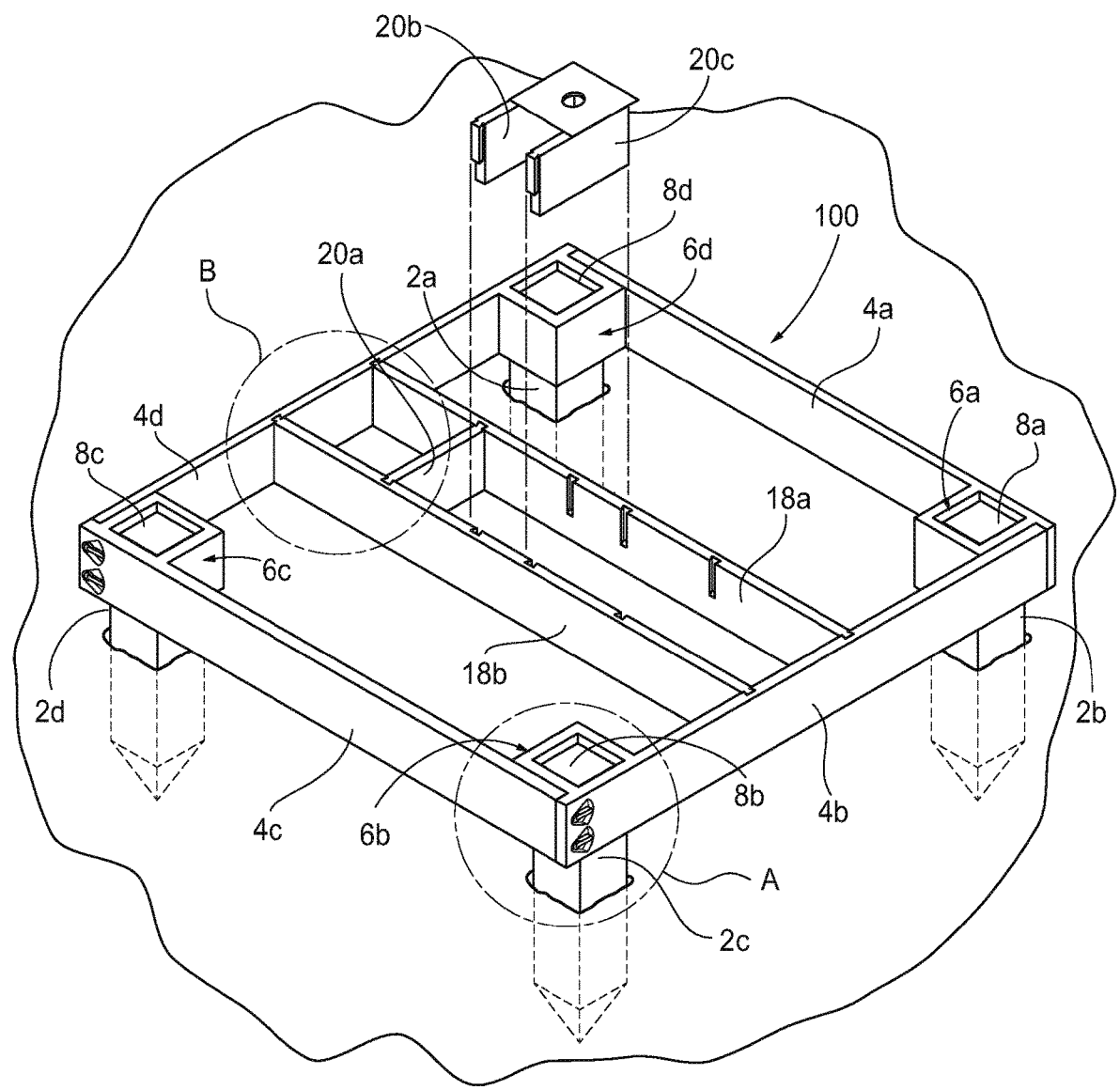
FIG. 3 is a perspective view of a base, positioned on the support members of FIG. 2, used to hold the sporting enclosure.
Figure 4A:
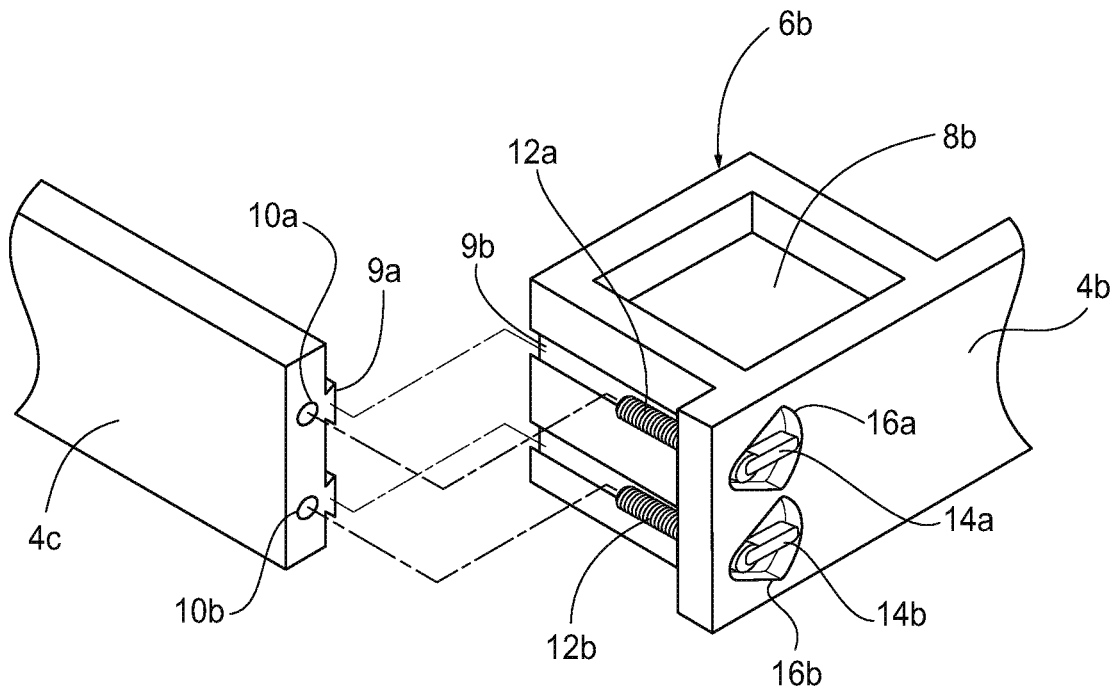
FIG. 4A is an exploded view of section A shown in FIG. 3 and shows a connecting arrangement between outer frame members of the base of FIG. 3.
Figure 4B:
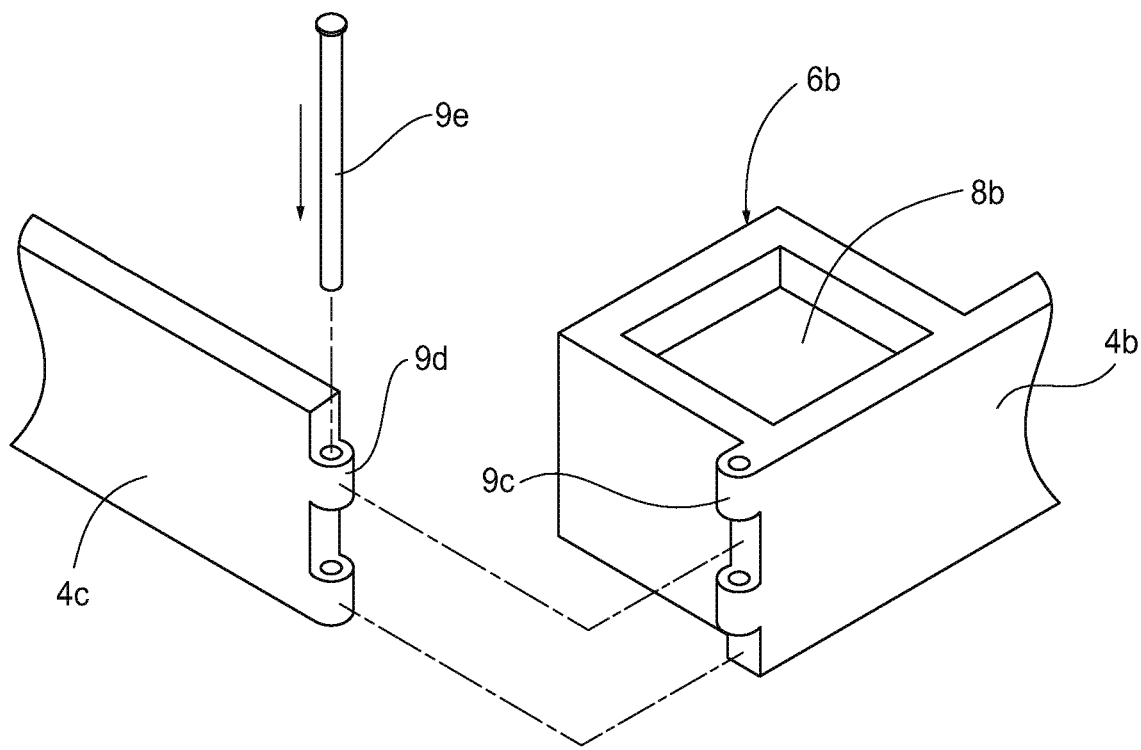
FIG. 4B is an exploded view of another connecting arrangement used to connect the outer frame members of the base of FIG. 3.
Figure 5:
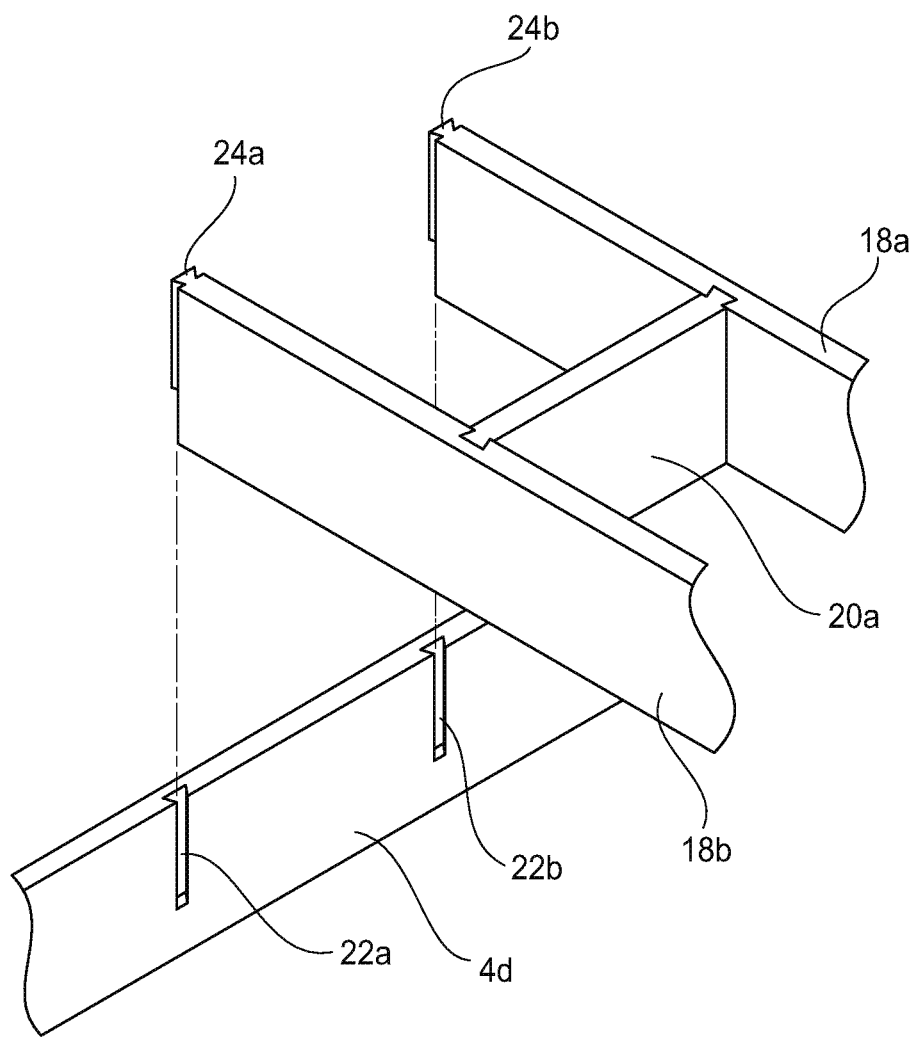
FIG. 5 is an exploded view of section B shown in FIG. 3 and shows a connecting arrangement between inner frame members of the base of FIG. 3.

With reference to FIGS. 3-5, the base 100 is described in greater detail. The base 100 is configured to rest on the support members 2a-2d once the support members 2a-2d have been positioned in the ground surface at a level position. As shown in FIG. 3, the base 100 may include four outer frame members 4a-4d. The outer frame members 4a-4d may be connected to move a generally square-shaped frame. It is also contemplated that the outer frame members 4a 4d may form other frames with different shapes, such as rectangular, triangular, or circular. Each outer frame member 4a-4d may connect to two other outer frame members 4a-4d. Each outer frame member 4a-4d may include an inner connection member 6a-6d to assist in placing the base 100 on the support members 2a-2d. The inner connection members 6a-6d may be U-shaped, with a two legs extending from an inner surface of the respective outer frame member 4a-4d and another leg that perpendicularly extends between the first legs. In this configuration, each outer frame member 4a-4d and each inner connection member 6a-6d, respectively, form a square-shaped enclosure configured to receive each respective support member 2a-2d. Each enclosure includes a cap 8a-8d that allows the base 100 to rest on a top surface of each support member 2a-2d. Once the support members 2a-2d have been inserted into the ground surface and the base 100 has been assembled (described in greater detail below), the base 100 may be placed over the support members 2a-2d such that the caps 8a-8d rest on each respective support member 2a-2d, which ensures the base 100 settles in a level position based on the insertion of the support members 2a-2d into the ground surface. It is also contemplated that the hunter may set up different sets of support members 2a-2d at multiple locations so that the hunter only needs to transport the base 100 and the hunting blind 200 between locations.

With reference to FIG. 4A, the connection of adjacent outer frame members 4a-4b is described. Although only shown in connection with the outer frame members 4b, 4c, it is to be understood that each pair of outer frame members 4a-4d may be connected in a similar fashion. The adjacent outer frame members 4b, 4c are positioned with an inner surface of one outer frame member 4b abutting an end face of an adjacent outer frame member 4c. An inner surface of an end of the outer frame member 4c may include a pair of dovetail protrusions 9a extending therefrom. One leg of the inner connection member 6b may include corresponding dovetail recesses 9b configured to receive the dovetail protrusions 9a of the outer frame member 9c. Although a dovetail shape is used for the protrusions 9a and recesses 9b, it is also contemplated that alternative shapes may also be used. As the outer frame members 4b, 4c are brought into contact, the dovetail protrusions 9a of the outer frame member 4c may be inserted into the dovetail recesses 9b defined in the inner connection member 6b. The locking arrangement created by the dovetail protrusions 9a and dovetail recesses 9b prevents vertical movement of the outer frame members 4b, 4c relative to one another. The end face of the outer frame member 4c may define at least two threaded apertures 10a, 10b. The outer frame member 4b may also define at least two apertures through which a fastener 12a, 12b may extend. The fasteners 12a, 12b may include a threaded portion that extends into the threaded apertures 10a, 10b of the outer frame member 4c. The fasteners 12a, 12b may also include a rotatable handle portion 14a, 14b. Each handle portion 14a, 14b may be rotatable either manually or through an automatic means to rotate and thread the fasteners 12a, 12b into the apertures 10a, 10b. When the handle portions 14a, 14b are not being used to rotate the fasteners 12a, 12b, the handle portions can be snapped into place within a recess 16a, 16b defined in the outer frame member 4b. In this manner, each pair of outer frame members 4a-4d may be connected to one another to form the outer frame portion of the base 100.

An alternative connection arrangement for the outer frame members 4a-4d is shown in FIG. 4B. Instead of using the dovetail protrusions 9a and recesses 9b to connect the outer frame members 4b, 4c, each outer frame member 4b, 4c may include a corresponding plurality of teeth 9c, 9d that may be fit together to lock the outer frame members 4b, 4c. Each protruding tooth 9c, 9d may define an aperture to receive a removable pin 9e once the teeth 9c, 9d have been fit together.

With reference to FIGS. 3 and 5, the inner frame portion of the base 100 is described. After the outer frame portion of the base 100 has been assembled, the inner frame portion may be assembled. The inner frame portion may include at least two inner frame members 18a, 18b and at least two inner cross members 20a-20c connected to the inner frame members 18a, 18b. Although a certain number of inner frame members and inner cross members are shown in the figures, it is to be understood that additional or fewer members may be provided to add or remove support to the base 100 as desired. Two of the outer frame members 4b, 4d may include at least two dovetail cuts 22a, 22b defined on an inner surface thereof. It is also contemplated, however, that alternative cuts or connection methods may be used to connect the outer frame members 4b, 4d to the inner frame members 18a, 18b. Each end of each inner frame member 18a, 18b may include a corresponding dovetail protrusion 24a, 24b configured for insertion into the respective dovetail cut 22a, 22b. As each dovetail protrusion 24a, 24b is inserted into the respective dovetail cut 22a, 22b, a friction fit is formed between the outer frame members 4b, 4d and the inner frame members 18a, 18b. Although FIG. 3 shows the inner frame members 18a, 18b connected to the outer frame members 4b, 4d, it is also contemplated that the inner frame members 18a, 18b may be connected to the outer frame members 4a, 4c.

Similar to the dovetail connection of the outer frame members 4b, 4d and the inner frame members 18a, 18b, the inner cross members 20a-20c may be connected in a dovetail arrangement with the inner frame members 18a, 18b. In one aspect, the inner cross members 20a-20c may be connected to inner surfaces of the inner frame members 18a, 18b such that the inner cross members 20a-20c are positioned between the inner frame members 18a, 18b. The inner cross members 20a-20c may extend in a perpendicular direction to the inner frame members 18a, 18b. Further, a seat base 26 may be attached to at least two of the inner cross members 20b, 20c. The seat base 26 is configured to receive and hold a removable seat on which the hunter may rest when hunting in the hunting blind 200 (described in greater detail below).

Figure 13A:
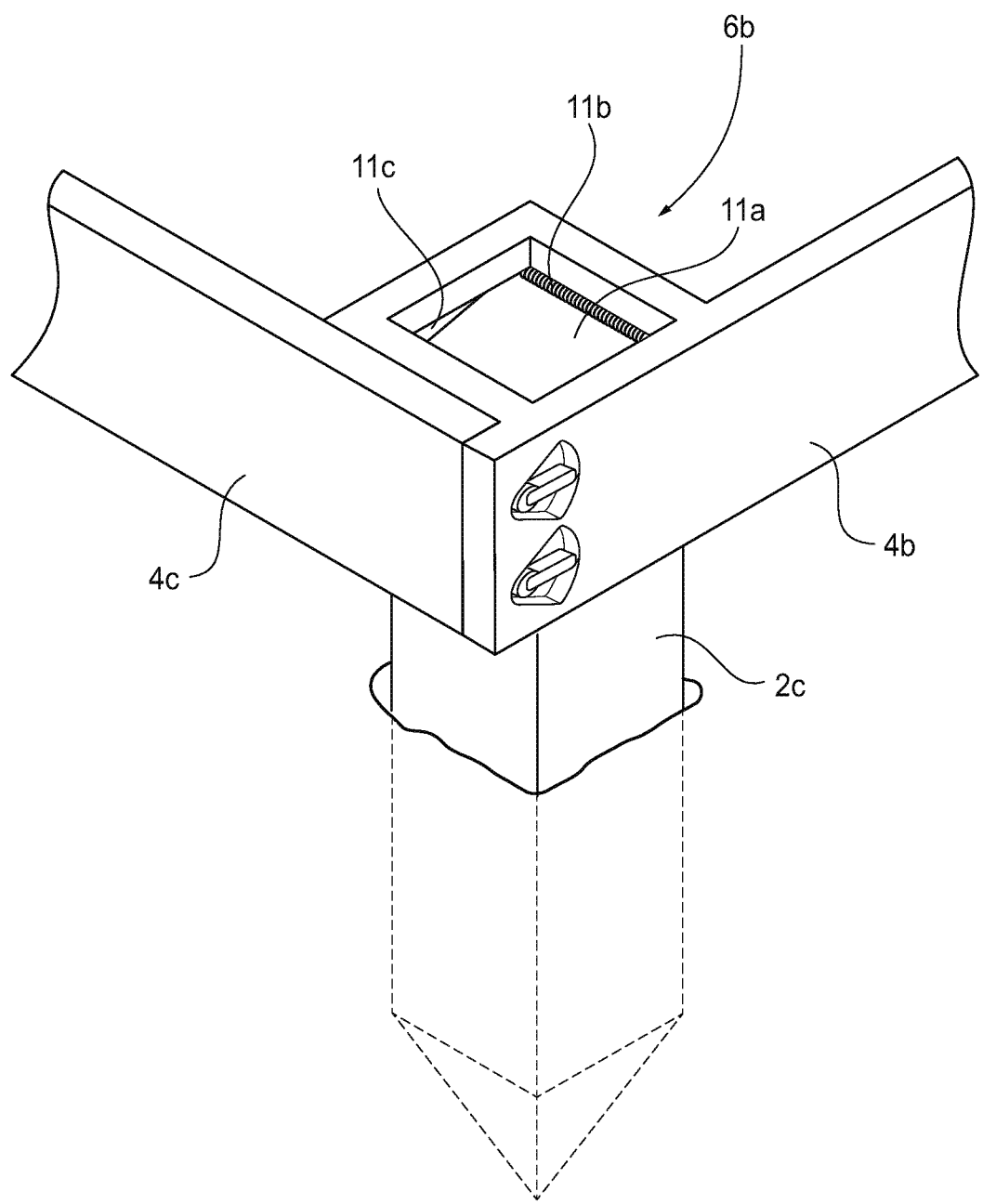
FIG. 13A is a perspective view of an insertion arrangement for a support member within an outer frame member of the base of FIG. 3.
Figure 13B:
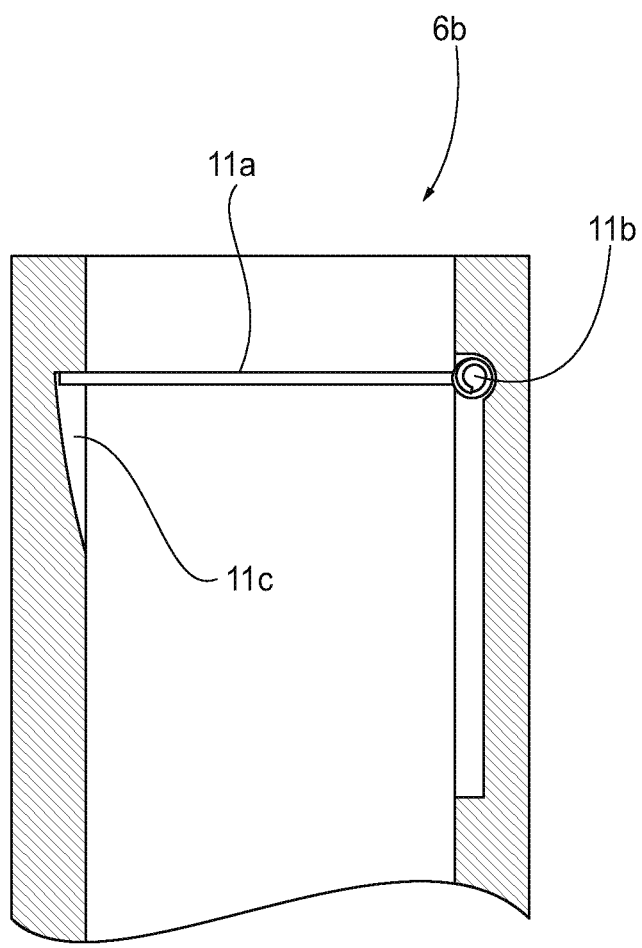
FIG. 13B is a side view of the insertion arrangement of FIG. 13A.

With reference to FIGS. 13A and 13B, an insertion arrangement for inserting the support members 2a-2d in the assembled outer frame members 4a-4d is described. Although only shown in connection with the outer frame members 4b, 4c, it is to be understood that each support member 2a-2d may be positioned in a respective corner of the base 100 in a similar fashion. The inner connection member 6b on the outer frame member 4b may include a rotatable, biased cap 11a that is configured to rotate downwards based on downward pressure on a top surface of the cap 11a. A spring 11b is provided in connection with the cap 11a so that, after pressure has been relieved from the top surface of the cap 11a, the cap 11a is biased back into a resting position against a recess 11c defined within the inner connection member 6b. Therefore, in one aspect, the outer frame member 4b, 4c may be assembled and then the corresponding support member 2c may be inserted into the inner connection member 6b, thereby pushing the cap 11a downwards. The individual can then apply pressure to the support member 2c to insert the support member 2c into the ground surface. The outer frame members 4b, 4c can then be lifted above the inserted support member 2c, thereby allowing the cap 11a to rotate back into its resting position against the recess 11c based on the biasing force of the spring 11b. The outer frame members 4b, 4c can then be lowered towards the support member 2c to allow the cap 11a to rest on the upper end of the support member 2c.

Figure 6:
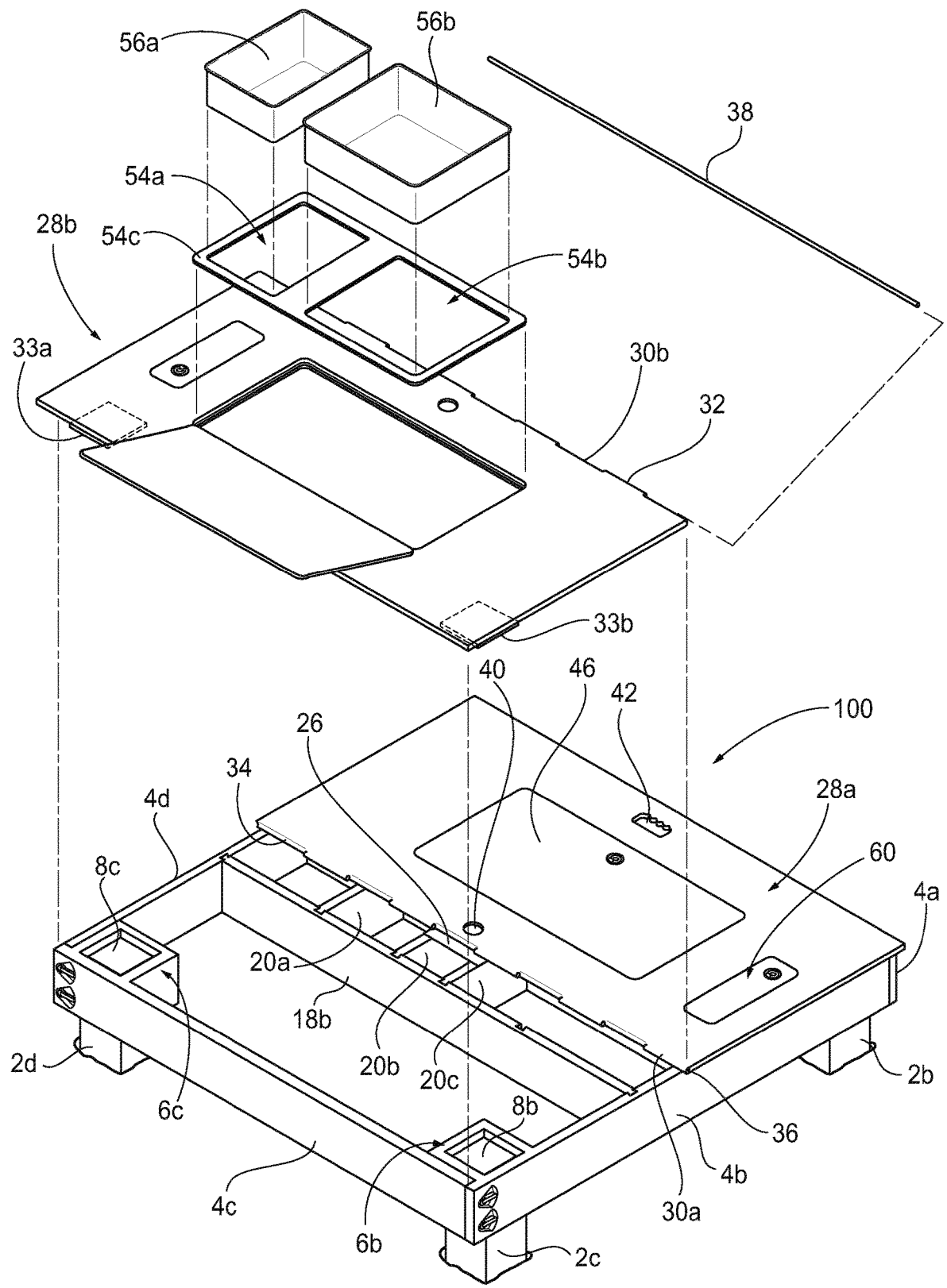
FIG. 6 is a perspective view of the assembly of a floor on the base of FIG. 3.
Figure 7:
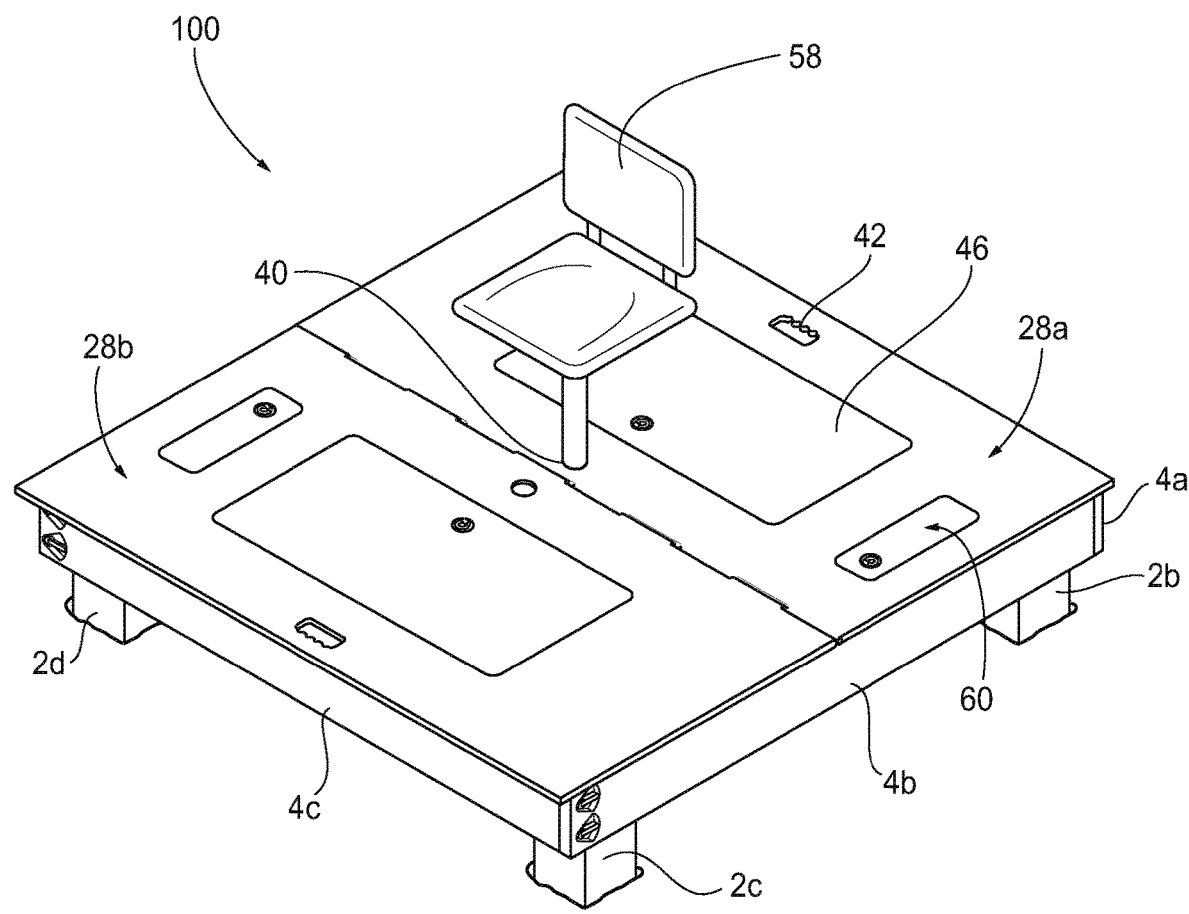
FIG. 7 is a perspective view of the base of FIG. 3 in an assembled position.
Figure 8:
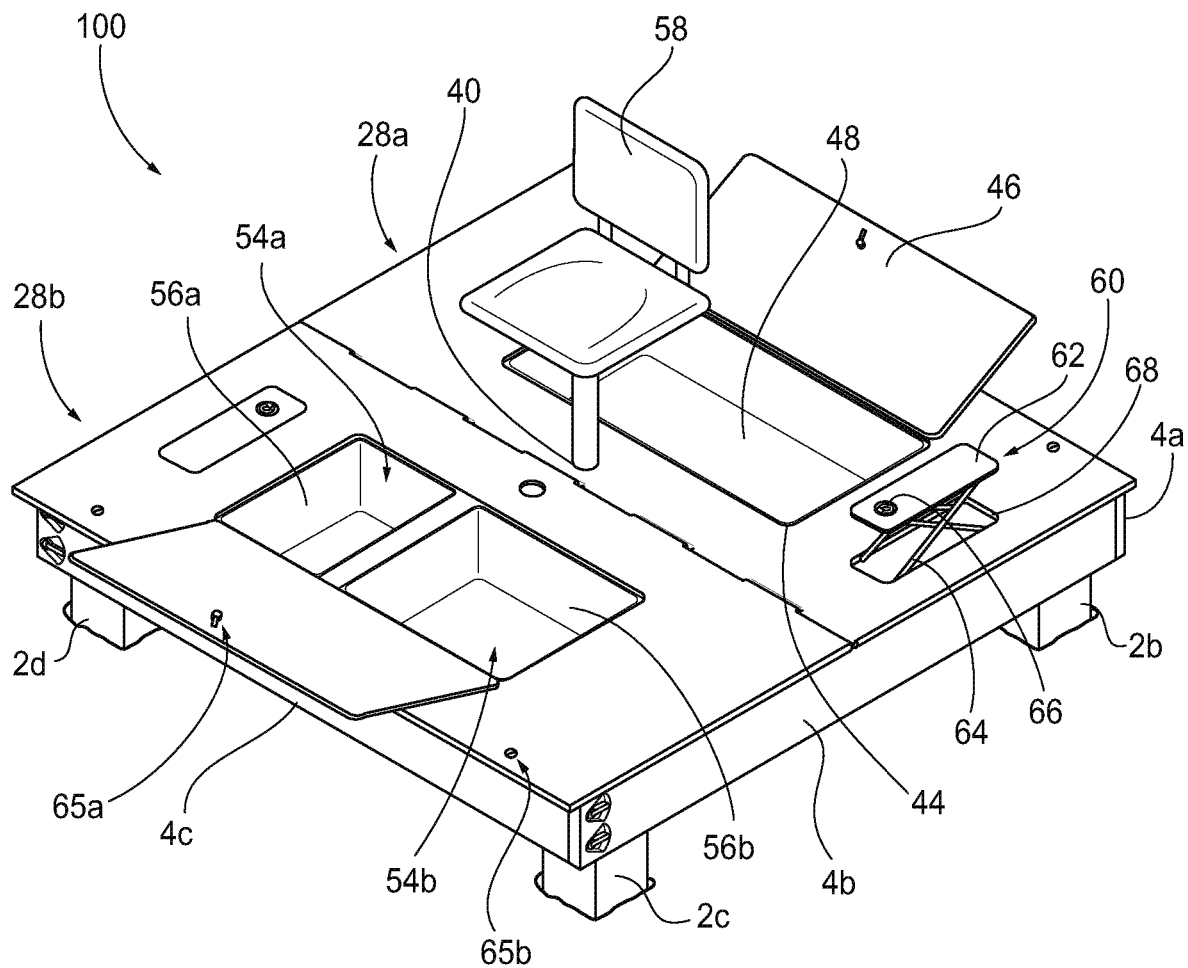
FIG. 8 is a perspective view of the assembled base of FIG. 6 showing open compartments and a table.

With reference to FIGS. 6-8, after the base 100 has been assembled and positioned on the support members 2a-2d, two floor panels 28a, 28b may be positioned on an upper surface of the base 100. The floor panels 28a, 28b may be made of lightweight, plastic material that is easily carried by a hunter into the woods to a desired hunting location. The floor panels 28a, 28b may be injection molded. As shown in FIG. 10, each floor panel 28a, 28b may have a more rigid base layer 29 and a padded, soundproof upper layer 31. The upper layer 31 may be made of a cushioned material to dampen and suppress any movement of the hunter on the floor panels 28a, 28b. The floor panels 28a, 28b may be substantially mirror images of one another so that either floor panel 28a, 28b can be positioned on either portion of the base 100. Each floor panel 28a, 28b is placed on one half of the base 100 to cover the upper surface of the base 100. Each floor panel 28a, 28b may include a pair of locators 33a, 33b configured to assist in positioning the floor panel 28a, 28b on the outer frame members 4a-4d. The locators 33a, 33b may be inserted into the inner connection members 6a-6d to position the floor panels 28a, 28b in a correct orientation on the outer frame members 4a-4d. The floor panels 28a, 28b should be rigid enough to allow a hunter to stand, lie, or sit on the floor panels 28a, 28b without cracking or bending, but should be light weight enough so that the floor panels 28a, 28b can be carried by the hunter with ease. The floor panels 28a, 28b may be rectangular in shape and may rest on the upper surface of the outer frame members 4a-4d, the inner frame members 18a, 18b, and the inner cross members 20a-20c. An inner edge 30a, 30b of one of the floor panels 28a, 28b may include a plurality of protrusions 32 that define an aperture which extends along a direction of the inner edge 30a, 30b. The protrusions 32 may be spaced along the inner edge 30a, 30b of the floor panel 28a, 28b. The inner edge 30a, 30b of the opposing floor panel 28a, 28b may include a plurality of recesses 34 configured to receive the protrusions 32 of the opposing floor panel 28a, 28b. An aperture 36 is defined in the inner edge 30a and extends from a first end of the inner edge 30a to an opposing second end of the inner edge 30a. After the floor panels 28a, 28b have been pushed together such that the protrusions 32 of one floor panel 28b have been positioned within the recesses 34 of the opposing floor panel 28a, a rod 38 may be inserted into the aperture 36 and through the apertures defined by the protrusions 32 such that the floor panels 28a, 28b are held together on the base 100. The rod connection between the floor panels 28a, 28b permits the floor panels 28a, 28b to rotate relative to one another.

Since each floor panel 28a, 28b is substantially the same to permit easy assembly on top of the base 100, the features of only one floor panel 28a will be discussed below. The floor panel 28a may define an aperture 40 adjacent the inner edge 30a of the floor panel 28a. When the floor panel 28a is positioned on the base 100, the aperture 40 may align with an aperture defined in the seat base 26 to allow a seat to be inserted through the aperture 40 and into the seat base 26. The floor panel 28a may also include a handle 42 defined adjacent an edge of the floor panel 28a that is opposite the inner edge 30a of the floor panel 28a. By gripping both handles 42 on both floor panels 28a, 28b, a hunter can easily carry the floor panels 28a, 28b to his/her chosen hunting spot.

Figure 10A:
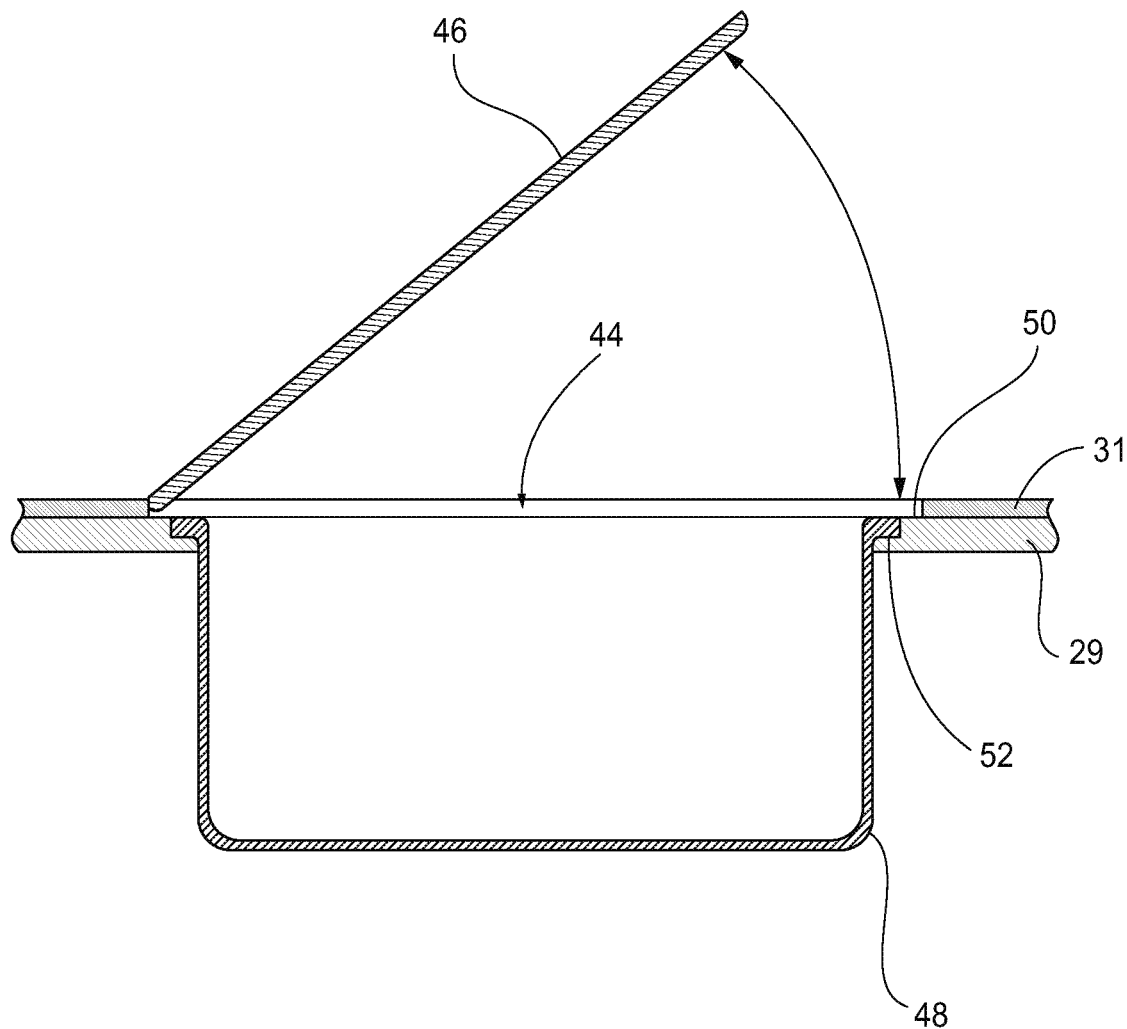
FIG. 10A is a cross-sectional view of a floor panel of the base of FIG. 6.

The floor panel 28a may also define an aperture 44 in the center of the floor panel 28a. A lid 46 may be rotatably connected to the floor panel 28a and may be configured to cover the aperture 44. It is contemplated that the lid 46 may include a lock to protect any contents stored in a bin 48 held within the aperture 44. The bin 48 may be removably positioned in the aperture 44, such that, after the floor panel 28a has been positioned on the base 100, the bin 48 can be inserted into the aperture 44 and used to store hunting equipment, sleeping bags, clothing, blankets, or any similar types of items. As shown in FIG. 10A, the aperture 44 may define a first ledge 50 upon which the lid 46 may rest when covering the aperture 44. The first ledge 50 may extend around the entire circumference of the aperture 44. The aperture 44 may also define a second ledge 52 upon which the bin 48 may rest when inserted into the aperture 44. The second ledge 52 may also extend around the entire circumference of the aperture 44. The bin 48 may include a lip that extends outwardly to rest on the second ledge 52. The second ledge 52 may be defined beneath the first ledge 50, such that, when the lid 46 is closed over the aperture 44, the lid 46 rests on the first ledge 50. When the lid 46 is closed on the aperture 44, a top surface of the lid 46 may be flush with a top surface of the floor panel 28a.

Figure 10B:
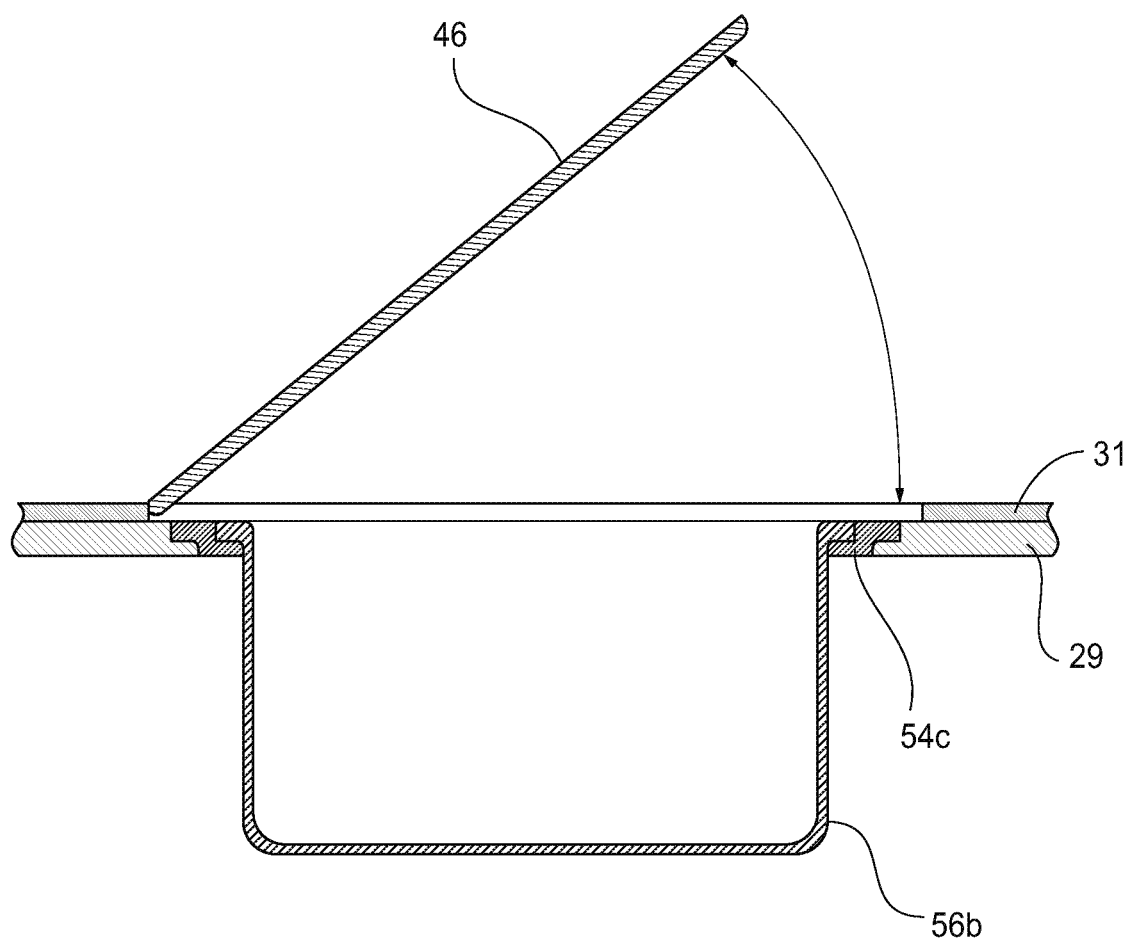
FIG. 10B is a cross-sectional view of a floor panel of the base of FIG. 6 including a frame to hold container in the floor panel.

As shown in FIGS. 6, 8, and 10B, instead of defining a single aperture 44 in the floor panel 28a, at least two sectioned apertures 54a 54b may be defined by a frame 54c that is placed in a floor panel 28b. It is contemplated, however, that the frame 54c may define more than two apertures. Similar to the aperture 44, the sectioned apertures 54a, 54b may define a first ledge configured to receive a lid and a second ledge to hold storage bins 56a, 56b in the section apertures 54a, 54b. The frame 54c may rest on a ledge formed in the aperture 44 of the floor panel 28b. One storage bin 56a may be used as a collapsible cooler to store drinks, ice, food, or any item that should be kept at a colder temperature. The other storage bin 56b may provide additional storage space for a hunter to hold clothing, hunting equipment, or any other items needed by the hunter while hunting.

As shown in FIG. 7, a seat 58 may be inserted through the aperture 40 and into the seat base 26. The height of the seat 58 may be adjustable to permit use by a plurality of different hunters. The seat 58 may also be rotatable around an axis to allow the hunter to spin the seat 58. It is also contemplated that the seat 58 may be collapsible for storage within one of the bins 48, 56a, 56b.

As shown in FIG. 8, a table 60 may also be provided on the floor panel 28a. The table 60 may include a table top 62 and a plurality of legs 64 that are attached to the table top 62 and the floor panel 28a. The legs 64 may be hingedly connected in pair so that the legs 64 can be folded and unfolded to pull the table 60 out of the floor panel 28a. A ring 66 may be provided in the table top 62 to allow the hunter to pull the table 60 out of the floor panel 28a. The table 60 may be held within a recess 68 defined in the floor panel 28a. When held within the recess 68, a top surface of the table top 62 may be flush with the upper surface of the floor panel 28a. The hunter may pull the ring 66 to pull the table 60 out of the recess 68. The legs 64 will unfold and extend upwards to an extended height such that the table top 62 is level with the seat 58. The hunter can use the table 60 to hold drinks, ammunition, hunting equipment, binoculars, or any other equipment that is used during hunting. When the hunter does not need the table 60, the table 60 can be pushed downwards so the legs 64 fold up and are stored within the recess 68. It is also shown in FIG. 8 that a lock 65a may be provided on the lid 46 of each floor panel 28a, 28b to permit the hunter to secure his/her equipment in the storage bins 48, 56a, 56b. It is also contemplated that additional locks 65b may be provided on the floor panels 28a, 28b to secure each floor panel 28a, 28b to each respective outer frame member 4a-4d to prevent theft of the base 100 elements when the hunter leaves the base 100 in the field.

Figure 9:
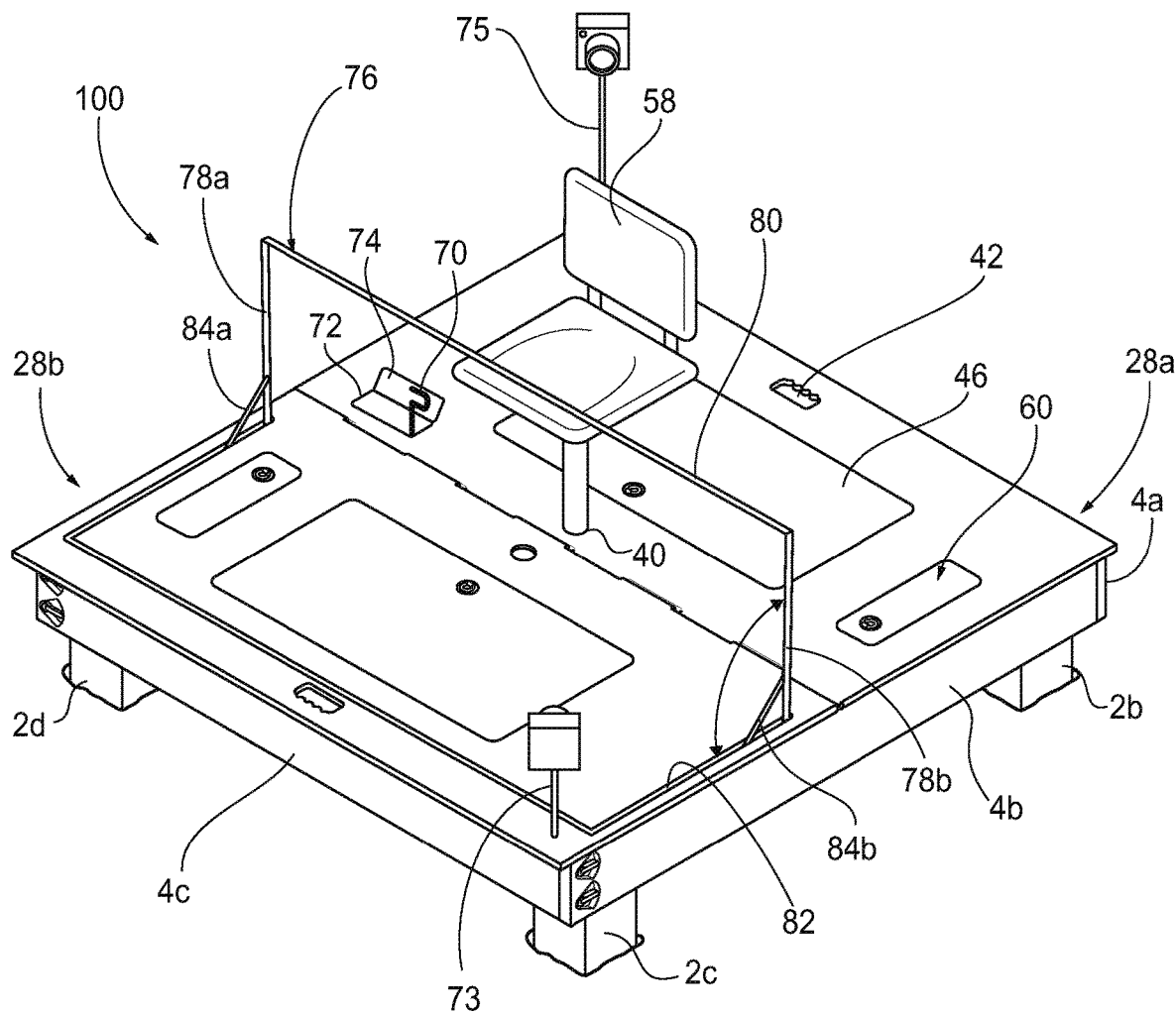
FIG. 9 is a perspective view of the assembled base of FIG. 6 with a sliding shooting rail and a plurality of camera mounts.
Figure 11:
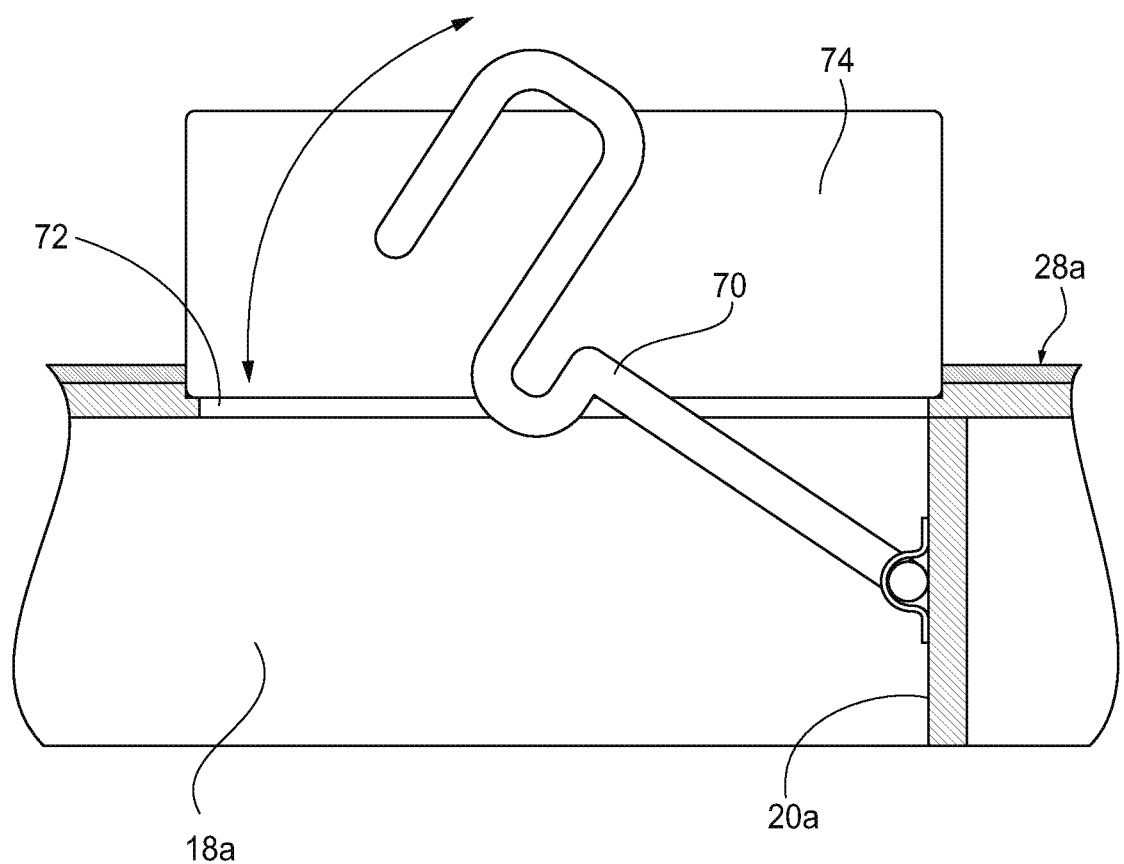
FIG. 11 is a side view of a bow holder housed within the assembled base of FIG. 6.

With reference to FIGS. 9 and 11, a bow holder 70 provided with the base 100 is described. The bow holder 70 may be stored in a compartment 72 defined in one of the floor panels 28a, 28b. The compartment 72 may be covered with a lid 74. The compartment 72 may be accessed by the hunter by opening the lid 74. The hunter may then pull the bow holder 70 out of the compartment 72. The bow holder 70 rotates upwardly out of the compartment 72 into an upright position. The bow holder 70 and compartment 72 may be provided adjacent the seat 58 to allow the hunter to reach or place his/her hunting bow on the bow holder 70 when sitting on the seat 58. The bow holder 70 may include a straight base member and a hook member provided on an end of the straight base member. The bow holder 70 may be configured to hold a hunting bow in a ready position so that a hunter can quickly grab the hunting bow and bring the hunting bow to a firing position. When sitting in a hunting blind, a hunter's chance at taking a shot at an animal occurs very quickly. In conventional hunting blinds, a hunter will often have to place his/her hunting bow on the ground in the hunting blind. When an animal comes into view, the hunter will often have to reach down and/or away from his/her position to grab the hunting bow, often taking his/her eyes off of the animal moving in front of the hunting blind. A considerable amount of noise may also be created when the hunter grabs the hunting bow off of the ground, which may spook the animal. Therefore, by using the bow holder 70, the hunter's bow is easily accessible at a position adjacent to the hunter. The bow holder 70 holds the hunter's bow off of the ground surface and adjacent the hunter's hands to permit the hunter to quickly grab his/her bow and move it to a firing position. When the bow holder 70 is not needed by the hunter, the bow holder 70 may be rotated downwardly into the compartment 72 and the lid 74 may be closed to store the bow holder 70 in the base 100.

With continued reference to FIG. 9, a first camera mount 73 and a second camera mount 75 may be provided on the base 100. The first camera mount 73 may be provided in a corner of the floor panel 28b. The first camera mount 73 may be provided in front of the seat 58. The second camera mount 75 may be positioned in a corner of the floor panel 28a, behind the seat 58. It is also contemplated that additional camera mounts may be provided on the floor panels 28a, 28b. Each camera mount 73, 75 is configured to hold a camera that is directed towards the seat 58 to film the hunter during his/her hunt. These camera mounts 73, 75 are especially useful for filming and production companies that film hunting-related shows and videos. The first camera mount 73 may be positioned lower relative to the floor panels 28a, 28b than the second camera mount 75 so as not to interfere with the hunter when shooting out of the hunting blind 200. The first camera mount 73 may be provided to allow a camera to shoot a video or take photographs of the hunter while he/she is hunting. The second camera mount 75 may be provided to allow a camera to shoot a video or take photographs of the field of vision of the hunter out of the hunting blind 200. It is also contemplated that the height of the camera mounts 73, 75 may be adjustable. It is contemplated the camera mounts 73, 75 may be configured to hold any type of video camera, including GoPro cameras or tail cams, or photographic camera.

With continuing reference to FIG. 9, a shooting rail 76 is shown in connection with the base 100. The shooting rail 76 may provide a rest on which the hunter can position his/her gun when sitting on the seat 58 in the hunting blind 200. The hunter can rest his/her gun on the shooting rail 76 to level the gun to obtain a more accurate shot. The shooting rail 76 may be provided on either floor panel 28a, 28b. In another aspect, a shooting rail 76 is provided on each floor panel 28a, 28b. The shooting rail 76 may include two support members 78a, 78b and a resting member 80. The support members 78a, 78b may extend substantially perpendicularly from the resting member 80 towards the floor panel 28b. The shooting rail 76 may be provided in a storage position or a shooting position. In the storage position, the shooting rail 76 is stored within a recess 82 defined in the floor panel 28b. The shape of the recess 82 may correspond to the shape of the shooting rail 76. When the hunter would like to use the shooting rail 76, the hunter may pull the shooting rail 76 out of the recess 82 causing the shooting rail 76 to rotate upwards. Once the shooting rail 76 has been rotated upwards into an upright position, the shooting rail 76 is provided at the shooting position. The bottom ends of the support members 78a, 78b may drop into apertures (not shown) defined in the recess 82 to lock the shooting rail 76 in position. A brace 84a, 84b may be provided on a lower end of each support member 78a, 78b to add further support to the shooting rail 76 when positioned in the shooting position. In one aspect, due to different hunters with different heights using the hunting blind 200, the height of the shooting rail 76 may be adjustable. The support members 78a, 78b may be telescoping members that can extend and retract once in the shooting position to adjust the height of the resting member 80 relative to the hunter. After the hunter has finished using the shooting rail 76, the hunter may pull the resting member 80 upwards to pull the support members 78a, 78b out of the apertures defined in the recess 82. The hunter may then rotate the shooting rail 76 downwards to lie in the recess 82 for storage.

Figure 14A:
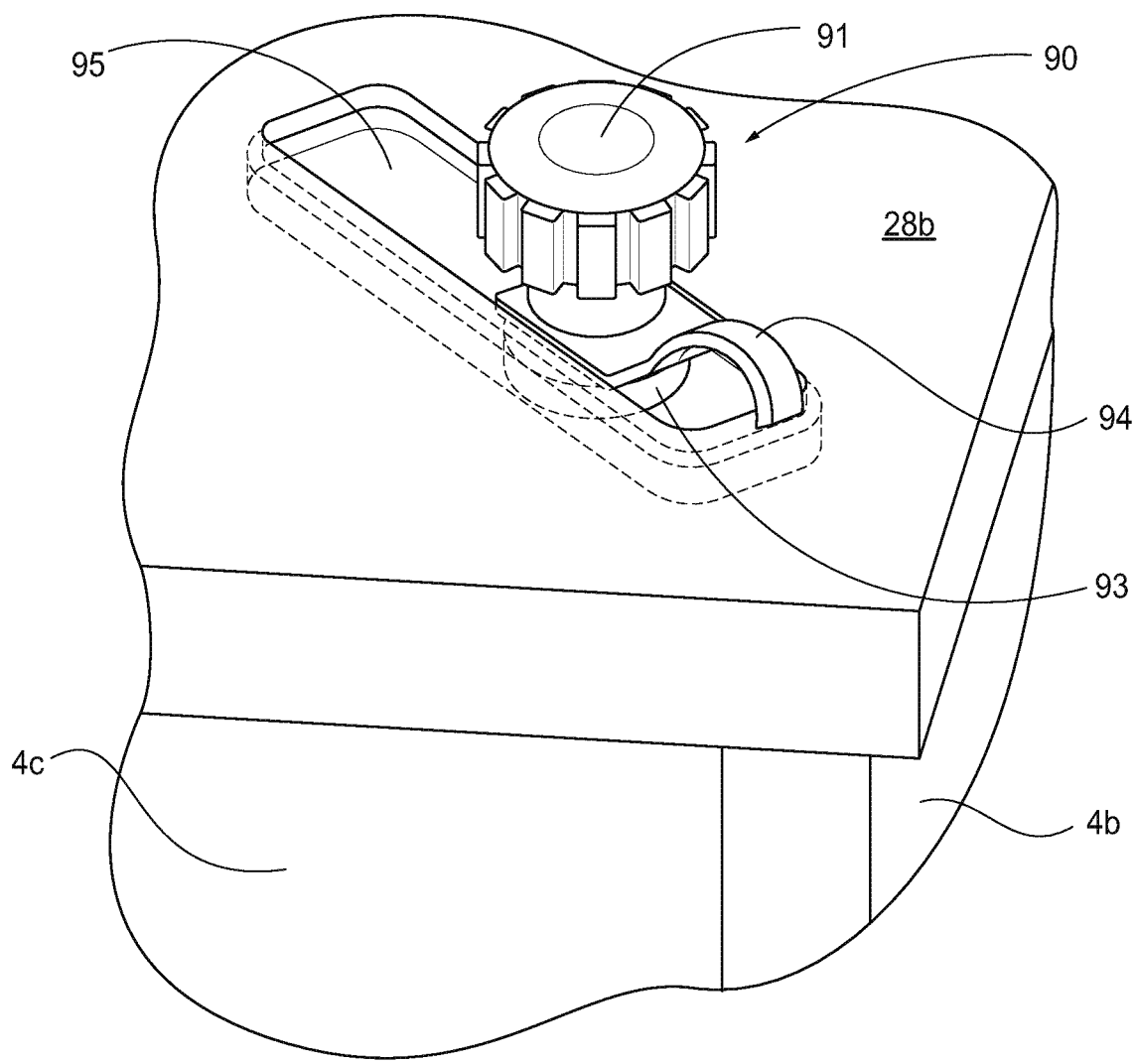
FIG. 14A is a perspective view of a securing arrangement for securing a hunting blind to the base of FIG. 3.
Figure 14B:
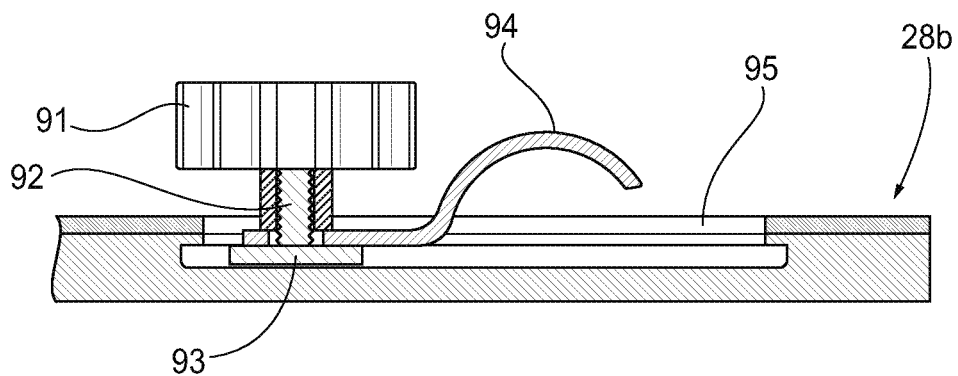
FIG. 14B is a cross-sectional view of the securing arrangement of FIG. 14A.

With reference to FIGS. 14A and 14B, a securing arrangement 90 for securing the hunting blind 200 to the base 100 is described. The base 100 is configured to support varying sizes of hunting blinds. Based on the diameter of the hunting blind 200, the securing arrangement 90 may be adjusted to secure the hunting blind 200 to the base 100. The securing arrangement 90 may include a knob 91, a threaded portion 92 extending from the knob 91, a nut 93 threaded onto an end of the threaded portion 92, and a hook 94 slidably provided on the threaded portion 92. The knob 91 may be rotated to either hold the securing arrangement 90 in a channel 95 defined in the corners of the floor panels 28a, 28b or permit the securing arrangement 90 to slide along the channel 95. The nut 93 may have a diameter that is wider than the diameter of a lower portion of the channel 95 to prevent the securing arrangement 90 from being pulled out of the channel 95. As the knob 91 is turned in a first direction, the threaded portion 92 is rotated away from the nut 93 to allow the hook 94 to slide on the threaded portion 92. A loop (not shown) from a corner of the hunting blind 200 may then be slid underneath the hook 94. The knob 91 may be rotated in a second, opposing direction to move the threaded portion 92 into the nut 93, thereby securing the hook 94 against the floor panel 28a and the securing arrangement 90 within the channel 95. With the hook 94 secured against the floor panel 28a, the loops from the hunting blind 200 are held in place on the base 100. Using the securing arrangement 90, larger hunting blinds and smaller hunting blinds can both be used with the base 100. The securing arrangement 90 may be slid inwards in the channel 95 to accommodate smaller hunting blinds, and the securing arrangement 90 may be slid outwards in the channel 95 to accommodate larger hunting blinds.

The hunting blind 200 and base 100 assembly provide several benefits over conventional hunting blinds. By using the support members 2a-2d to adjust the height of the base 100 to a level position on uneven terrain, the hunting blind 200 and base 100 increase the number of locations at which hunters can hunt. The floor panels 28a, 28b may be waterproof to keep the floor dry within the hunting blind 200. Since the base 100 lifts the hunting blind 200 off of the ground surface and utilizes floor panels 28a, 28b, the interior of the hunting blind 200 is kept free of mud, dirt, and debris that can often move into conventional hunting blinds. By raising the base 100 from the ground surface, the assembly protects the hunter from any animals that may move into the hunting blind 200, such as rattlesnakes. The raised base 100 also permits the hunting blind 200 to be used in a swamp, where bucks and other animals are typically comfortable. Conventional hunting blinds do not have the necessary frame and floor platform to rise above the swamp waters. The base 100 is also easily assembled, thereby decreasing the assembly time of a conventional hunting blind or tree stand in half. The base 100 is also portable, permitting the hunter to easily disassemble the base 100 and move to another hunting location to spot animals. The bins 48, 56a, 56b provided in the floor panels 28a, 28b provide increasing storage space for a hunter's hunting equipment, food, clothing, or sleeping equipment. The bins 48, 56a, 56b permit the hunter to store his/her equipment under the floor panels 28a, 28b, thereby decreasing the amount of items that are left on top of the floor panels 28a, 28b that the hunter may trip over or move, thereby creating noise that may spook any nearby animals. Further, by keeping the floor panels 28a, 28b clear of equipment and debris, the hunter can comfortably lay on the floor panels 28a, 28b for a mid-day nap on all day hunts. Conventional hunting blinds do not typically include storage space for equipment. The seat 58 almost permits the hunter a 360 degree turning range, which allows the hunter to quietly rotate his/her view around the hunting blind 200 without creating excess noise. The table 60 and the bow holder 70 provide ready access for the hunter to his/her bow, binoculars, ammunition, range finder, food, calls, or any other equipment that may be held on the table 60.

With reference to FIGS. 15-18, another example of a base 300 for supporting a sporting enclosure is described. The base 300 includes many similar features as the base 100 described above, but with slight variations to several features. It is also be understood that any of the features and accessories provided with the base 100 described above may be incorporated and used with the base 300 currently being described. The base 300 includes at least two separate sections 302a, 302b that are hingedly connected to one another. In one example, the sections 302a, 302b are connected via a hinge 304 at a top surface 306a, 306b of each section 302a, 302b. Any suitable hinge arrangement may be used to connect the two sections 302a, 302b. By hingedly connecting the sections 302a, 302b, the sections 302a, 302b are configured to fold towards one another such that the top surfaces 306a, 306b of the sections 302a, 302b are brought in contact with one another. By folding the sections 302a, 302b together, the base 300 is easily transported to a hunter's hunting destination or location. Each section 302a, 302b may include handles (not shown) defined therein so that a hunter can carry the base 300 when the sections 302a, 302b are folded or the hunter can hold the folded base 300 in a backpack or satchel to move the base 300 to the hunting destination or location. In one example, a locking arrangement may be provided on the sections 302a, 302b so that the sections 302a, 302b can be locked together when in the folded position. At least one level indicator 308a, 308b may be installed in each section 302a, 302b to assist a hunter in leveling the base 300 relative to an inclined surface.

Figure 15:
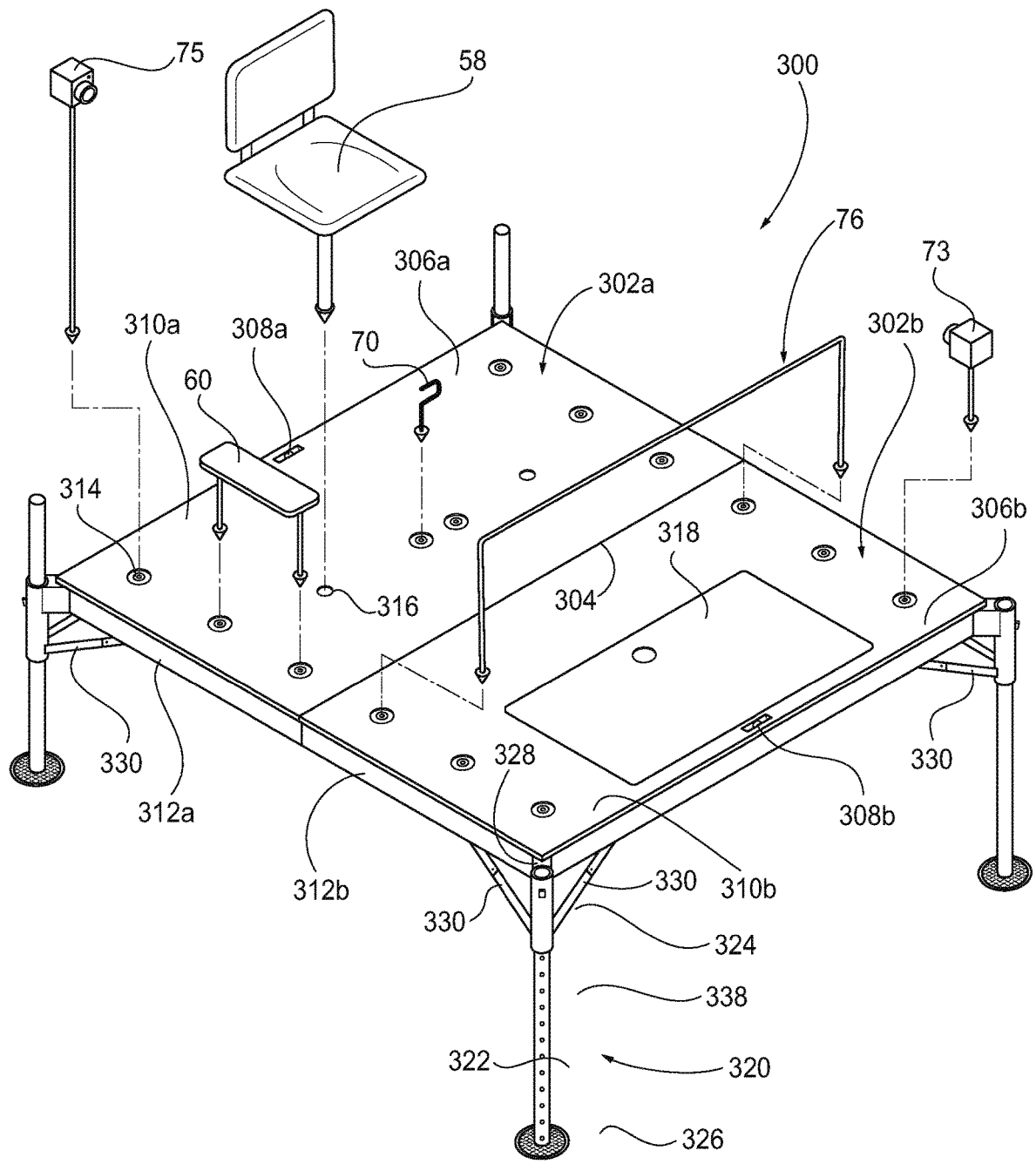
FIG. 15 is a top perspective view of another embodiment of a base for supporting a sporting enclosure, such as a hunting blind.

Each section 302a, 302b includes a floor panel 310a, 310b and a frame structure 312a, 312b. The floor panels 310a, 310b are substantially flat and provide support for a hunter to stand, sit, or lie down on the base 300. The floor panels 310a, 310b may have a similar construction as the floor panels 28a, 28b described above. The frame structures 312a, 312b may be of any construction or configuration to provide adequate support for the base 300 to hold at least one hunter within a hunting blind provided on the base 300. Each of the sections 302a, 302b may define at least one camera mount hole 314 to allow a hunter to position and move a mountable camera at/to different positions on the base 300. In one example, each section 302a, 302b includes three separate mount holes 314 on two sides thereof. As shown in FIG. 15, these mount holes 314 have an inclined receiving surface to assist in receiving any attachments that are inserted into the mount holes 314. For example, a removable table 60, a bow holder 70, a shooting rail 76, or any other desired attachment may include cone-shaped locking elements that are received in the mount holes 314. The attachments may be locked in the mount holes 314 via a snap-fit connection, a friction-fit connection, or any other connection to removably lock the attachment in the mount holes 314. While FIG. 15 depicts the locking elements as cone-shape, it is contemplated that any sufficient locking element can be used to connect the attachments in the mount holes 314. The attachments are removably held within the mount holes 314 so that the attachments can be disconnected from the mount holes 314 and stored in a storage bin when not in use. One section 302a may include at least one chair mount hole 316 to receive a mountable/portable chair (not shown) for the hunter to sit on while hunting. In one example, two chair mount holes 316 are defined in the section 302a so that, depending on whether the hunter is right-handed or left-handed, the chair can be mounted in the base 300 at an appropriate position to ensure the hunter has sufficient room for rotating a drawn bow or gun within the hunting blind. At least one section 302b may include a lid 318 rotatably connected to the floor panel 310b that permits access to a storage bin (not shown), such as the storage bin arrangement discussed above in connection with the base 100. The lid 318 may include a lock (not shown) to ensure no items are stolen from the storage bin when the base 300 is left out in the open.

Figure 18:
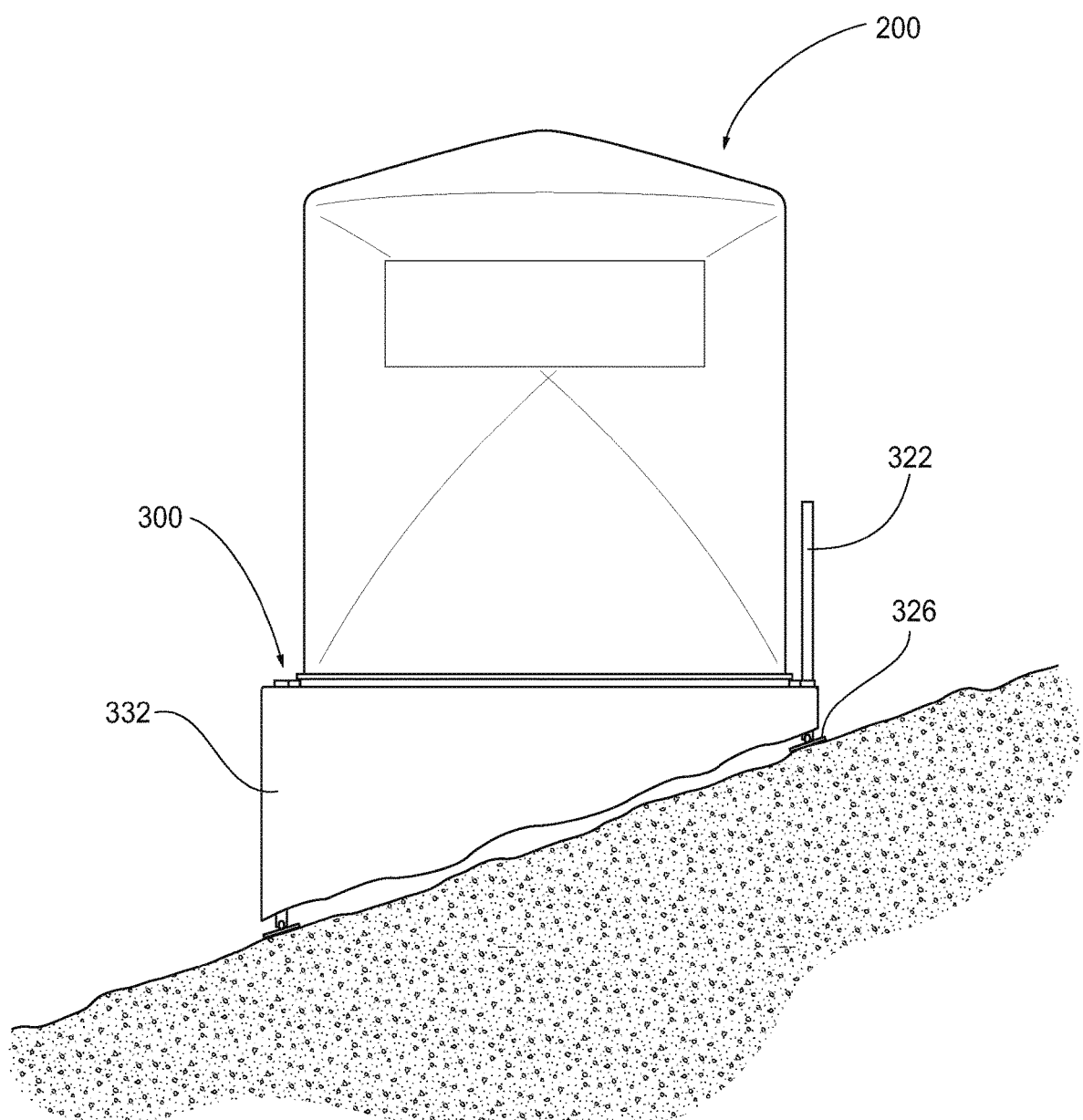
FIG. 18 is a side view depicting the base of FIG. 15 installed on an inclined surface with a sporting enclosure supported thereon.

As shown in FIGS. 15 and 18, each corner of the base 300 has an adjustable leg assembly 320. The adjustable leg assemblies 320 permit a hunter to individually adjust the height of each adjustable leg assembly 320 so that the base 300 is provided at a level position when installed on an inclined surface. Each adjustable leg assembly 320 may include a single leg member 322 or a pair of telescoping leg members (not shown) that provides added height to the base 300. The leg members 322 are movable within a bracket 324 rotatably held on the frame 312a, 312b of the base 300. The leg members 322 are movable upward and downward within the brackets 324 to adjust the height position of the leg members 322 relative to the base 300 or an inclined surface. Each leg member 322 may include a base member 326 provided on a bottom end thereof. The base members 326 assist in placing the base 300 and hunting blind 200 at a swampy, muddy, flooded, or watery location that may not have such a solid surface on which to install the base 300. The base members 326 help to distribute the weight of the base 300 and the hunt blind 200 (including the hunter standing therein) on the soggy, wet surface. The base members 326 include a plurality of apertures that allow the soggy, wet surface to pass through while the base members 326 rest on more solid ground.

Figure 16:
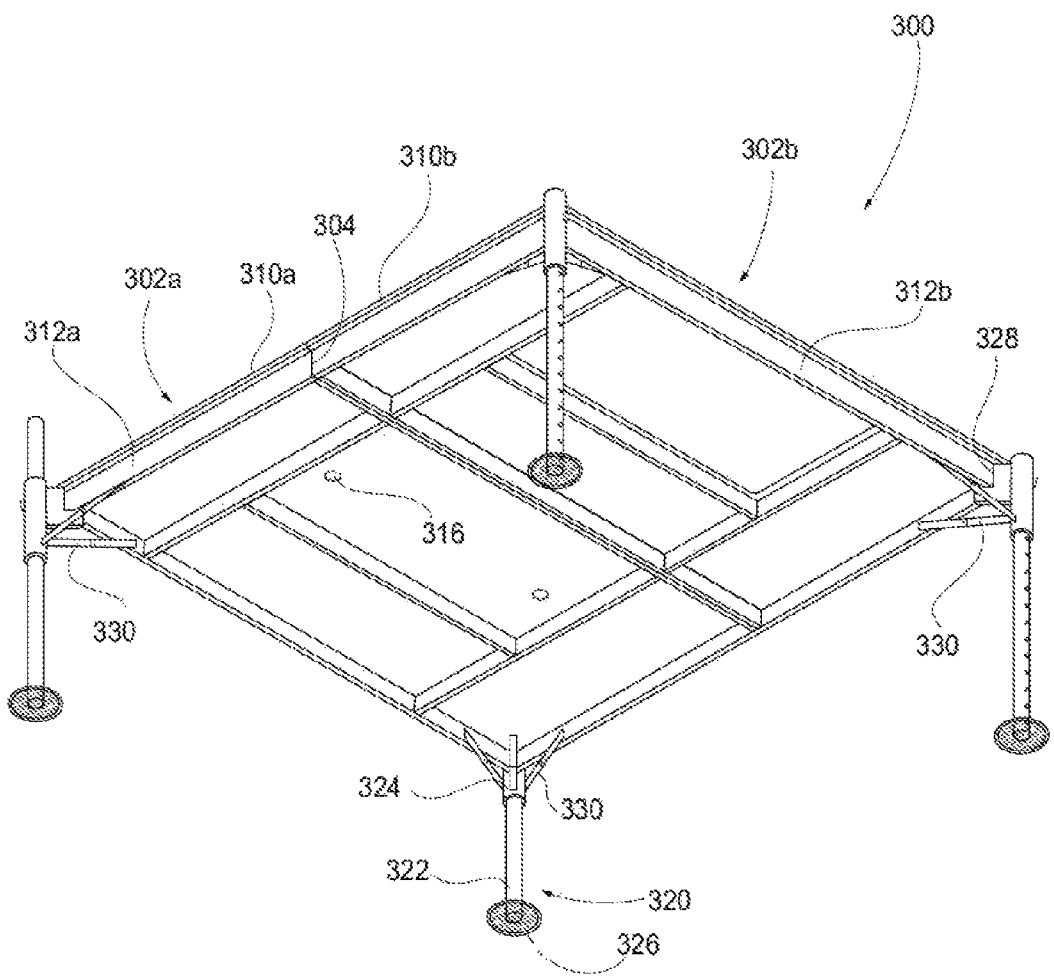
FIG. 16 is a bottom perspective view of the base of FIG. 15.
Figure 17:
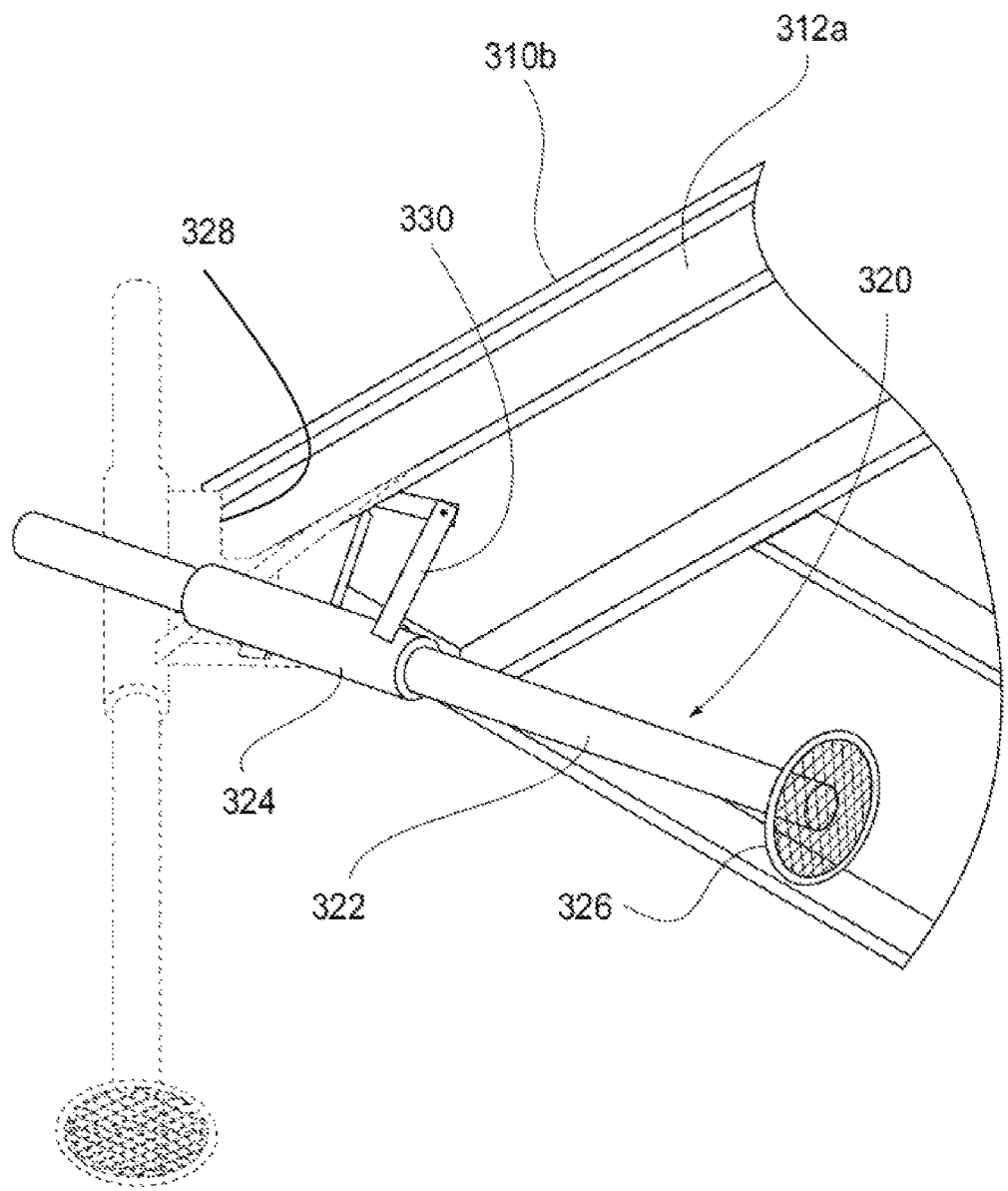
FIG. 17 is an isolated view of one of the folding legs of the base of FIG. 15.

As shown in FIGS. 16 and 17, each of the adjustable leg assemblies 320 is rotatably between an extended position and a stored position. In the extended position, the adjustable leg assemblies 320 are positioned to hold the base 300 and hunting blind 200 on a surface. The adjustable leg assemblies 320 may also be rotated from the extended position to a stored position to store the adjustable leg assemblies 320 within the frames 312a, 312b to allow the section 302a, 302b to be folded and transported by a hunter. To permit rotation of the adjustable leg assemblies 320 between the extended position and the stored position, the bracket 324 is held within a slot 328 defined within the frame 312a, 312b. The slot 328 permits rotation of the bracket 324 and leg member 322 underneath the frame 312a, 312b. The bracket 324 is also attached at least one retracting member 330 rotatably held on an underside of the floor panel 310a, 310b. In one example, at least two retractable members 330 are connected to the bracket 324 and the floor panel 310a, 310b. The retractable members 330 include two folding members that move between an extended position and a retracted position. In another example, the retractable member 330 is a hydraulic cylinder or a spring-biased cylinder that can assist in locking the bracket 324 in the extended or stored position. As the bracket 324 is rotated to the extended position, the retractable member 330 also extends to the extended position. It is contemplated that locking arrangements (not shown) may be provided on the underside of the floor panels 310a, 310b to lock the leg members 322 in the stored position during transport of the base 300. As shown in FIG. 18, after the base 300 and hunting blind 200 have been installed at the hunting location, a skirt 332 may be attached to the outer side of the sections 302a, 302b by any suitable connection methods (i.e., hooks, hook-and-loops fasteners, such as Velcro, snap buttons, buttons, zippers, or adhesive). The skirt 332 may have a camouflage pattern to conceal the leg members 322 of the base 300 when installed on the surface. It is contemplated that any suitable camouflage pattern may be used and that the skirt 332 may include a different camouflage pattern on each side thereof so that the skirt 332 is reversible to accommodate different hunting locations.

Figure 19:
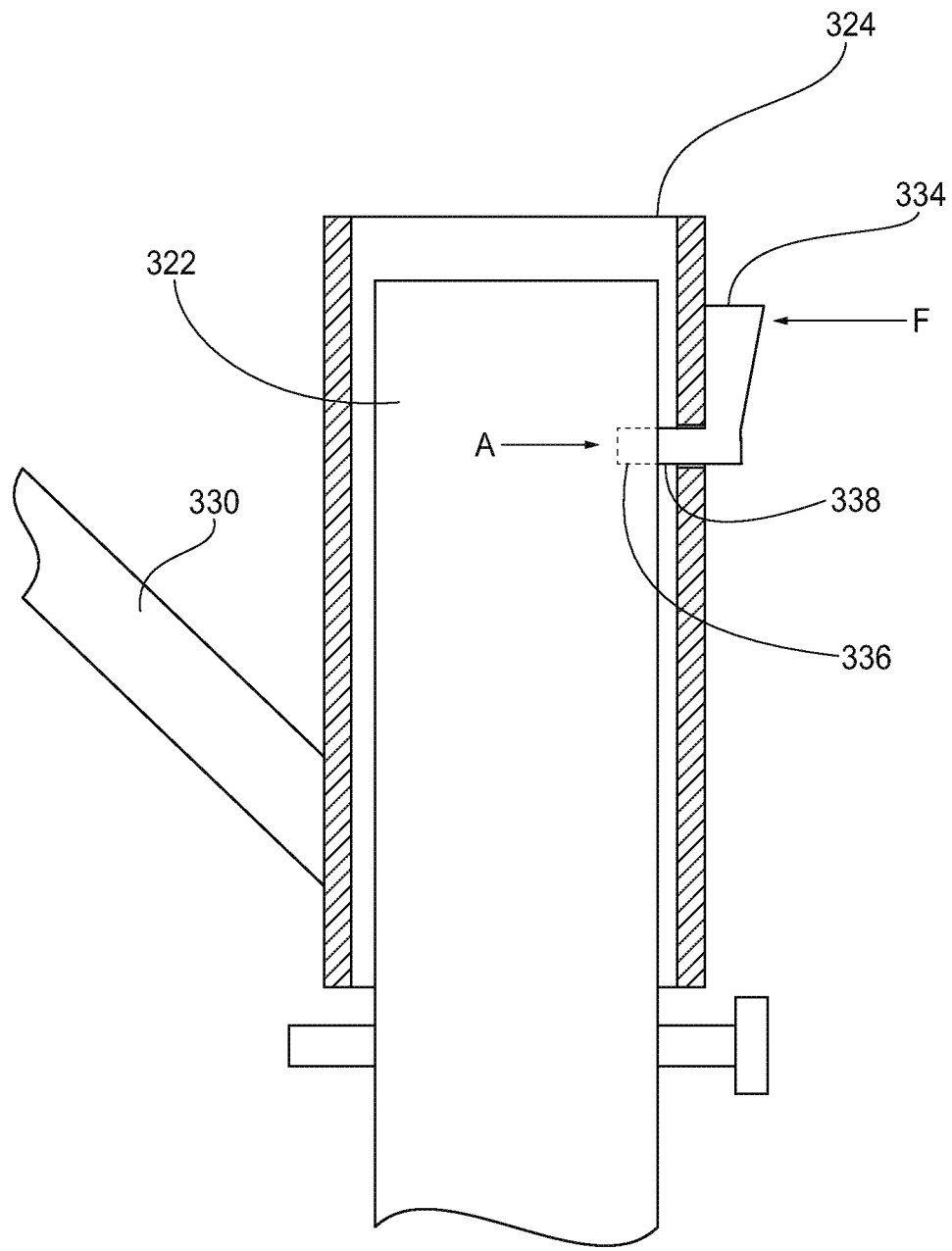
FIG. 19 is a cross-sectional view of an adjustable leg assembly provided on the base of FIG. 15.

With reference to FIG. 19, the adjustable leg assembly 320 is described in greater detail. In order to move the leg member 322 of each adjustable leg assembly 320 within the bracket 324 to adjust the height of the leg member 322 relative to the surface, an actuating button 334 is provided on the bracket 324 to allow for each adjustment of the height of the leg member 322. The actuating button 334 extends from an outer surface of the bracket 324 and extends through the bracket 324 to a cavity defined in the bracket 324 to receive the leg member 322. One end of the actuating button 334 includes a pin 336 that is movable between an engaged and disengaged position with a particular hole 338 defined in the leg member 322. In one example, the actuating button 334 is spring-biased such that the pin 336 is biased to the engaged position. As shown in FIG. 15, each leg member 322 defines a plurality of holes 338 that correspond to different height positions for the leg member 322. The pin 336 of the actuating button 334 is insertable into each of the holes 338 to lock the leg member 322 at a particular height relative to the surface. To adjust the height of the leg member 322, a user will push the actuating button 334 with a force F towards the bracket 324. As the actuating button 334 is pressed inward, the opposing end of the actuating button 334 having the pin 336 is moved outwardly in a direction A to remove the pin 336 from a particular hole 338 in the leg member 322. The user can then either move the leg member 322 within the bracket 324 or move the base 300 to move the bracket 324 relative to the leg member 322 so that the pin 336 can be inserted into a different hole 338 in the leg member 322. After the desired height has been reached for the leg member 322, the user will release pressure on the actuating button 334, thereby permitting the pin 336 to be biased into the corresponding hole 338 in the leg member 322. Each adjustable leg assembly 320 can be adjusted in this manner to ensure the base 300 is positioned level relative to an inclined surface.

While various aspects of the base 100 and hunting blind 200 were provided in the foregoing description, those skilled in the art may make modifications and alterations to these aspects without departing from the scope and spirit of the disclosure. For example, it is to be understood that this disclosure contemplates that, to the extent possible, one or more features of any aspect may be combined with one or more features of any other aspect. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:
1. A base for supporting a sporting enclosure, comprising:
   a plurality of outer frame members connected to one another to form an outer frame;
   at least one floor panel positioned on a top surface of the outer frame; and
   a plurality of support members configured to support the outer frame, wherein a height of each support member relative to a ground surface is adjustable to provide a level position for the outer frame, and wherein each support member is held on the outer frame via a bracket that is received within a slot defined in the outer frame to permit the support members to rotate between an extended position in which the support members are used to support the outer frame on the ground surface and a stored position in which the support members are stored within the outer frame.

2. The base as claimed in claim 1, wherein the at least one of the floor panels defines at least one aperture to receive a storage bin and further comprising at least one storage bin received in the at least one aperture.

3. The base as claimed in claim 1, wherein the base is comprised of two separate sections rotatably connected to one another, each section including a portion of the outer frame and at least one floor panel.

4. The base as claimed in claim 1, further comprising a removable seat positioned on one of the floor panels.

5. The base as claimed in claim 1, wherein a first floor panel defines an aperture that receives a single storage bin, and wherein a second floor panel includes a frame that defines at least two apertures that each receive a storage bin.

6. The base as claimed in claim 1, further comprising a table stored in one of the floor panels, the table being configured to move from a stored position within the floor panel to an upright extended position.

7. The base as claimed in claim 1, further comprising a bow holder provided on one of the floor panels.

8. The base as claimed in claim 1, further comprising at least one camera mount provided on one of the floor panels.

9. The base as claimed in claim 8, wherein the at least one camera mount comprises a first camera mount provided on a first floor panel, and a second camera mount provided on a second floor panel, the second camera mount having a height greater than a height of the first camera mount.

10. The base as claimed in claim 1, further comprising a shooting rail provided on one of the floor panels.

11. The base as claimed in claim 10, wherein the shooting rail is configured to move from a stored position within the floor panel to a shooting position in which the shooting rail is positioned perpendicular to the floor panel.

12. The base as claimed in claim 1, wherein each floor panel comprises an upper padded layer and a rigid base layer.

13. A sporting enclosure and base, comprising:
a sporting enclosure; and
a base configured to support the sporting enclosure, the base comprising:
an outer frame;
at least two floor panels rotatably connected to one another and supported by the outer frame, and
a plurality of support members configured to support the outer frame, wherein a height of each support member relative to the ground surface is adjustable to provide a level position for the outer frame, and wherein each support member is held on the outer frame via a bracket that is received within a slot defined in the outer frame to permit the support members to rotate between an extended position in which the support members are used to support the outer frame on the ground surface and a stored position in which the support members are stored within the outer frame.

14. The sporting enclosure and base as claimed in claim 13, wherein at least one of the floor panels defines an aperture to receive a storage bin; and
wherein the storage bin is positioned in the aperture.

15. The sporting enclosure and base as claimed in claim 13, wherein the base comprises two separate sections rotatably connected to one another, each section comprising a portion of the outer frame and one floor panel.

16. The sporting enclosure and base as claimed in claim 13, further comprising a removable seat positioned on one of the floor panels.

17. The sporting enclosure and base as claimed in claim 13, wherein a first floor panel defines an aperture that receives a single storage bin, and wherein a second floor panel includes a frame that defines at least two apertures that each receive a storage bin.

18. The sporting enclosure and base as claimed in claim 13, further comprising a table stored in one of the floor panels, the table being configured to move from a stored position within the floor panel to an upright extended position.

19. The sporting enclosure and base as claimed in claim 13, further comprising a bow holder provided on one of the floor panels.

20. The sporting enclosure and base as claimed in claim 13, further comprising at least one camera mount provided on one of the floor panels.

21. The sporting enclosure and base as claimed in claim 20, wherein the at least one camera mount comprises a first camera mount provided on a first floor panel, and a second camera mount provided on a second floor panel, the second camera mount having a greater height than the first camera mount.

22. The sporting enclosure and base as claimed in claim 13, further comprising a shooting rail provided on one of the floor panels.

23. The sporting enclosure and base as claimed in claim 22, wherein the shooting rail is configured to move from a stored position within the floor panel to a shooting position in which the shooting rail is positioned perpendicular to the floor panel.

24. The sporting enclosure and base as claimed in claim 13, wherein each floor panel comprises an upper padded layer and a rigid base layer.

25. The sporting enclosure and base as claimed in claim 13, the sporting enclosure comprising a hunting blind.

* * * * *